US012665545B2

(12) United States Patent
Hansen et al.

(10) Patent No.: US 12,665,545 B2
(45) Date of Patent: *Jun. 23, 2026

(54) SOLAR FORECASTING FOR NETWORKED POWER PLANTS

(71) Applicant: 1st Avenue Nova, LLC, Los Angeles, CA (US)

(72) Inventors: Lukas Hansen, El Dorado Hills, CA (US); Gautham Ramesh, San Francisco, CA (US); Thomas Buttgenbach, Los Angeles, CA (US)

(73) Assignee: 1st Avenue Nova, LLC, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/940,679

(22) Filed: Nov. 7, 2024

(65) Prior Publication Data

US 2025/0150031 A1     May 8, 2025

Related U.S. Application Data

(63) Continuation of application No. PCT/US2023/013968, filed on Feb. 27, 2023, which (Continued)

(51) Int. Cl.
H02S 50/00 (2014.01)
H02J 3/00 (2006.01)
(Continued)

(52) U.S. Cl.
CPC .............. H02S 50/00 (2013.01); H02J 3/004 (2020.01); H02J 3/381 (2013.01); H02J 13/10 (2026.01); H02J 2101/24 (2026.01)

(58) Field of Classification Search
CPC ....................................................... H02S 50/00
(Continued)

(56) References Cited

U.S. PATENT DOCUMENTS

| | | | |
|---|---|---|---|
| 9,438,041 B2 | 9/2016 | Roy et al. | |
| 9,945,264 B2 | 4/2018 | Wichmann et al. | |

(Continued)

FOREIGN PATENT DOCUMENTS

| | | |
|---|---|---|
| CN | 112086998 A | 12/2020 |
| WO | WO-2023219696 A1 | 11/2023 |

OTHER PUBLICATIONS

Final Office Action for U.S. Appl. No. 17/742,980, by Buttgenbach, mailed Sep. 23, 2022; 11 pages.

(Continued)

*Primary Examiner* — Joseph Chang
(74) *Attorney, Agent, or Firm* — COOLEY LLP

(57) ABSTRACT

A method may include obtaining irradiance data at a first time and a second time from sensors, determining whether one or more solar modules of a plurality of networked power plants will be covered by a shadow or shade at a third time based on the irradiance data, and generating, based on the determination, a power output prediction for each power plant of the networked power plants at the third time. The method may further include receiving power delivery profiles for first and second loads, adjusting a power output of one or more power plants of the networked power plants based at least in part on the power output prediction and the power delivery profiles for the first and second loads, and allocating a combined power output of the power plants to the first and second loads based on first and second load reliability thresholds.

20 Claims, 18 Drawing Sheets

700 ⇀

Related U.S. Application Data is a continuation of application No. 17/879,270, filed on Aug. 2, 2022, now Pat. No. 11,489,491, which is a continuation-in-part of application No. 17/742,980, filed on May 12, 2022, now Pat. No. 11,611,217.

(51) Int. Cl.

| | |
|---|---|
| *H02J 3/38* | (2006.01) |
| *H02J 13/10* | (2026.01) |
| *H02J 101/24* | (2026.01) |

(58) Field of Classification Search
USPC .......................................................... 307/84
See application file for complete search history.

(56) References Cited

U.S. PATENT DOCUMENTS

| | | | | |
|---|---|---|---|---|
| 10,331,089 | B2 | 6/2019 | Khabibrakhmanov et al. | |
| 10,409,925 | B1 | 9/2019 | Hoff | |
| 10,756,543 | B2 | 8/2020 | Detmers et al. | |
| 11,063,554 | B1 | 7/2021 | Hansen et al. | |
| 11,381,090 | B2 | 7/2022 | Srinivasan et al. | |
| 11,451,191 | B1 | 9/2022 | Hansen et al. | |
| 11,489,491 | B1 * | 11/2022 | Hansen | H02J 3/003 |
| 11,588,438 | B2 | 2/2023 | Hansen et al. | |
| 11,588,439 | B1 | 2/2023 | Hansen et al. | |
| 11,611,217 | B1 * | 3/2023 | Buttgenbach | H02J 3/004 |
| 11,689,155 | B1 | 6/2023 | Hansen et al. | |
| 11,848,560 | B2 | 12/2023 | Buttgenbach | |
| 11,923,682 | B1 * | 3/2024 | Kanan | H02J 3/32 |
| 12,244,147 | B1 * | 3/2025 | Buttgenbach | H02J 3/32 |
| 2010/0293045 | A1 | 11/2010 | Burns et al. | |
| 2011/0276269 | A1 | 11/2011 | Hummel | |
| 2014/0200723 | A1 | 7/2014 | Roy et al. | |
| 2016/0172859 | A1 | 6/2016 | Marhoefer | |
| 2017/0014449 | A1 | 1/2017 | Bangera et al. | |
| 2017/0104449 | A1 | 4/2017 | Drees | |
| 2017/0331292 | A1 | 11/2017 | Rive et al. | |
| 2017/0358929 | A1 | 12/2017 | Koeppe et al. | |
| 2018/0210976 | A1 | 7/2018 | Goyal et al. | |
| 2018/0232557 | A1 | 8/2018 | Chang et al. | |
| 2019/0204405 | A1 | 7/2019 | Arliaud et al. | |
| 2021/0285415 | A1 | 9/2021 | Vamvas | |
| 2022/0311379 | A1 | 9/2022 | Hansen et al. | |
| 2022/0376655 | A1 | 11/2022 | Hansen et al. | |
| 2022/0407454 | A1 | 12/2022 | Hansen et al. | |
| 2023/0038773 | A1 | 2/2023 | Hansen et al. | |
| 2023/0198464 | A1 | 6/2023 | Hansen et al. | |
| 2023/0369866 | A1 | 11/2023 | Buttgenbach | |

OTHER PUBLICATIONS

Final Office Action for U.S. Appl. No. 18/119,067, by Buttgenbach, mailed Aug. 23, 2023; 8 pages.
International Preliminary Report on Patentability for International Application No. PCT/US2023/013968, by 8ME Nova, LLC, mailed Nov. 21, 2024; 8 pages.
International Search Report and Written Opinion for International Application No. PCT/US2023/013968, by 8ME Nova, LLC, mailed Jun. 7, 2023; 10 pages.
Non-Final Office Action for U.S. Appl. No. 17/742,980, by Buttgenbach, mailed Aug. 5, 2022; 9 pages.
Non-Final Office Action for U.S. Appl. No. 17/898,982, by Hansen et al., mailed Nov. 28, 2022; 9 pages.
Non-Final Office Action for U.S. Appl. No. 18/119,067, by Buttgenbach, mailed Jun. 29, 2023; 7 pages.
Notice of Allowance for U.S. Appl. No. 17/210,399, by Hansen et al., mailed May 17, 2021; 8 pages.
Notice of Allowance for U.S. Appl. No. 17/344,706, by Hansen et al., mailed Aug. 18, 2022; 2 pages.
Notice of Allowance for U.S. Appl. No. 17/344,706, by Hansen et al., mailed Aug. 3, 2022; 7 pages.
Notice of Allowance for U.S. Appl. No. 17/742,980, by Buttgenbach, mailed Feb. 8, 2023; 10 pages.
Notice of Allowance for U.S. Appl. No. 17/879,270, by Hansen et al., mailed Oct. 4, 2022; 2 pages.
Notice of Allowance for U.S. Appl. No. 17/879,270, by Hansen et al., mailed Sep. 22, 2022; 7 pages.
Notice of Allowance for U.S. Appl. No. 17/898,982, by Hansen et al., mailed Jan. 18, 2023; 7 pages.
Notice of Allowance for U.S. Appl. No. 17/972,863, by Hansen et al., mailed Jan. 17, 2023; 7 pages.
Notice of Allowance for U.S. Appl. No. 18/104,036, by Hansen et al., mailed Apr. 26, 2023; 7 pages.
Notice of Allowance for U.S. Appl. No. 18/119,067, by Buttgenbach, mailed Nov. 3, 2023; 7 pages.
United States Environmental Protection Agency (EPA) et al., "Guide to Purchasing Green Power: Renewable Electricity, Renewable Energy Certificates, and On-Site Renewable Generation," Office of Air (6202J) EPA430-K-04-015, www.epa.govgreenpower, Mar. 2010, Updated: Sep. 2018, downloaded from https://www.epa.gov/greenpower/guide-purchasing-green-power on Jul. 26, 2022; 149 pages.

* cited by examiner

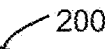

Obtain irradiance data at a solar power plant at a first time and a second time, where the solar plant includes a plurality of solar modules (210)

Process the irradiance data at the first time and the second time to generate an output that indicates whether one or more solar modules of the plurality of solar modules will be covered by a shadow or shade at a third time (220)

Generate a prediction of the power output of the solar power plant at the third time based at least in part on the output (230)

Adjust the power output of the solar power plant based on the prediction (240)

Notify a grid operator of the predicted power output of the solar power plant (250)

FIG. 2

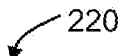

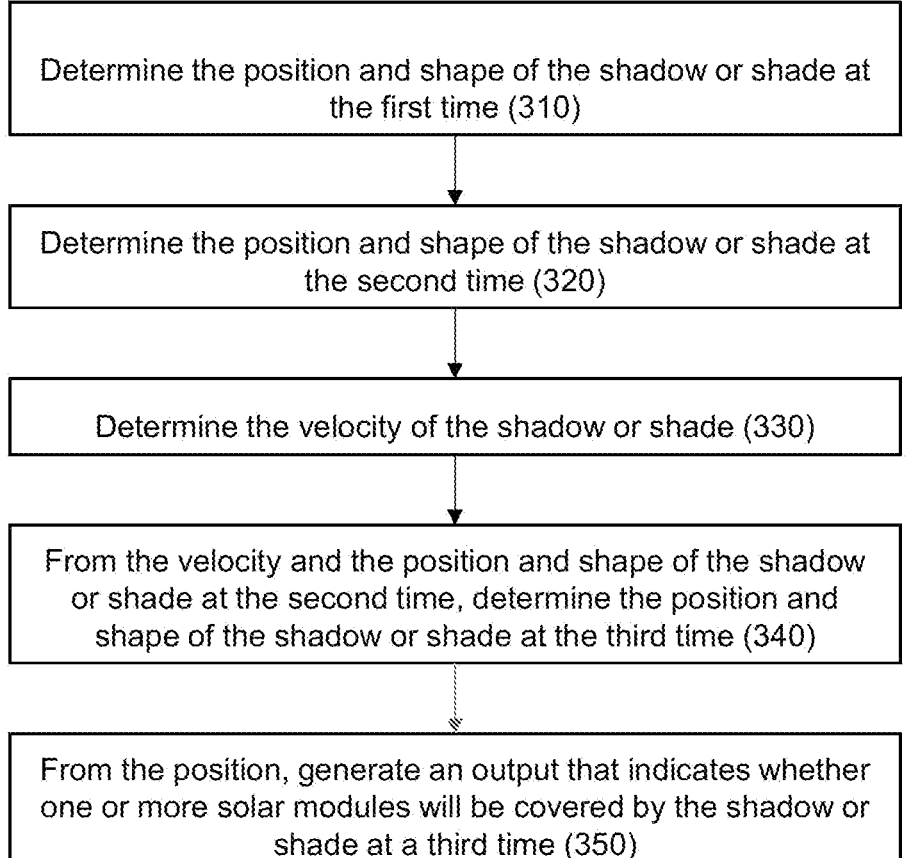

Determine the position and shape of the shadow or shade at the first time (310)

Determine the position and shape of the shadow or shade at the second time (320)

Determine the velocity of the shadow or shade (330)

From the velocity and the position and shape of the shadow or shade at the second time, determine the position and shape of the shadow or shade at the third time (340)

From the position, generate an output that indicates whether one or more solar modules will be covered by the shadow or shade at a third time (350)

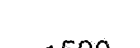

500

```
┌──────────────────────────────────────────────────────┐
│  Obtain irradiance data at a solar power plant at a   │
│  first time and a second time, where the solar plant  │
│  includes a plurality of solar modules (510)          │
└──────────────────────────────────────────────────────┘
                          │
                          ▼
┌──────────────────────────────────────────────────────┐
│  Process the irradiance data at the first time and    │
│  the second time to generate an output that indicates │
│  whether one or more solar modules of the plurality   │
│  of solar modules will be covered by a shadow or      │
│  shade at a third time (520)                          │
└──────────────────────────────────────────────────────┘
                          │
                          ▼
┌──────────────────────────────────────────────────────┐
│  Use the output as an input to a solar tracking       │
│  algorithm (530)                                      │
└──────────────────────────────────────────────────────┘
```

FIG. 5

······ REPP1+REPP2  —— Combined requirement

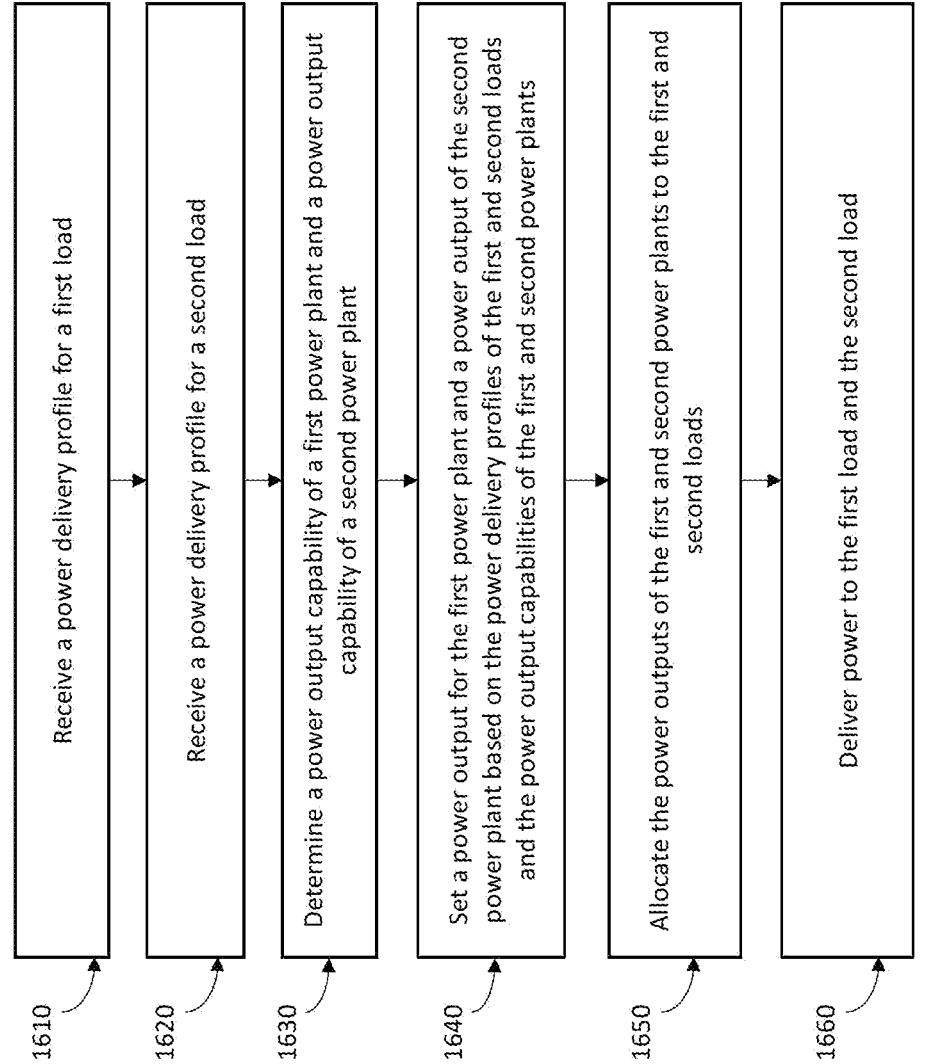

1610    Receive a power delivery profile for a first load

1620    Receive a power delivery profile for a second load

1630    Determine a power output capability of a first power plant and a power output capability of a second power plant 1640    Set a power output for the first power plant and a power output of the second power plant based on the power delivery profiles of the first and second loads and the power output capabilities of the first and second power plants 1650    Allocate the power outputs of the first and second power plants to the first and second loads 1660    Deliver power to the first load and the second load

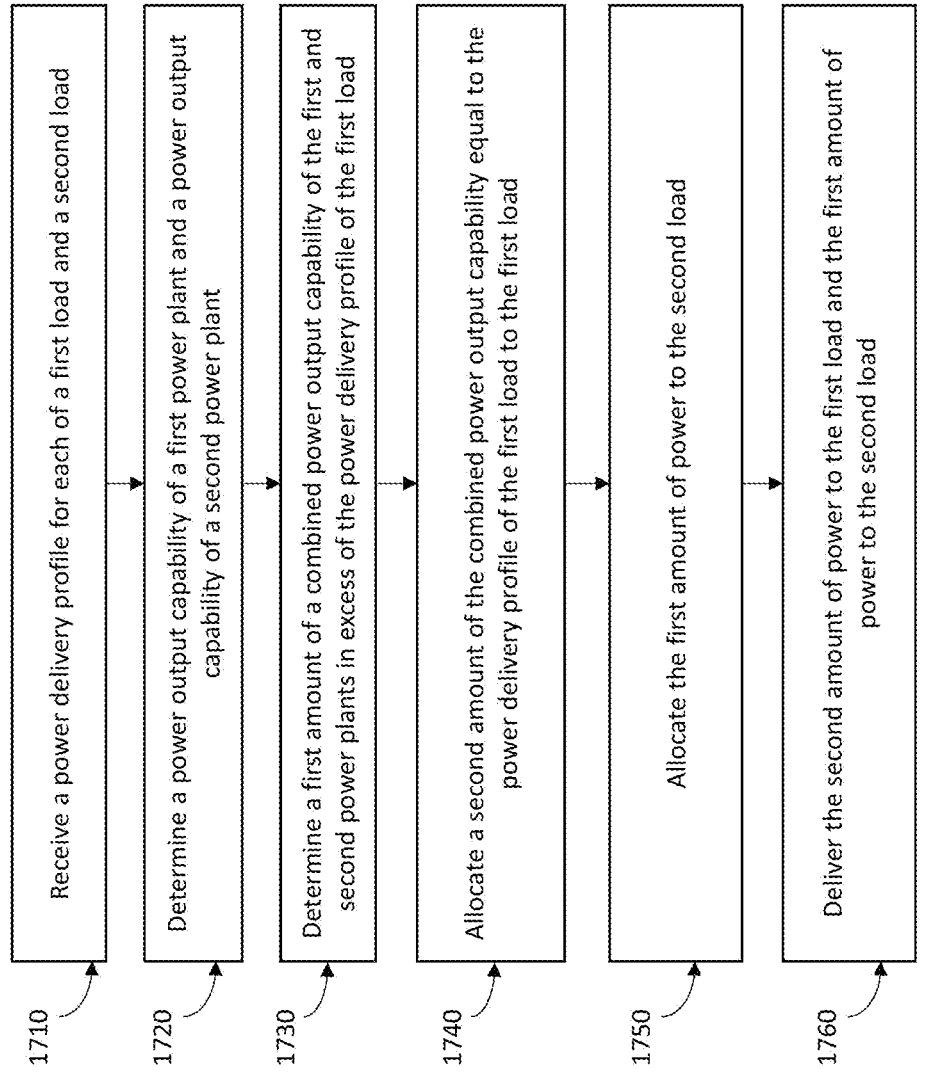

1710 Receive a power delivery profile for each of a first load and a second load 1720 Determine a power output capability of a first power plant and a power output capability of a second power plant 1730 Determine a first amount of a combined power output capability of the first and second power plants in excess of the power delivery profile of the first load 1740 Allocate a second amount of the combined power output capability equal to the power delivery profile of the first load to the first load 1750 Allocate the first amount of power to the second load 1760 Deliver the second amount of power to the first load and the first amount of power to the second load

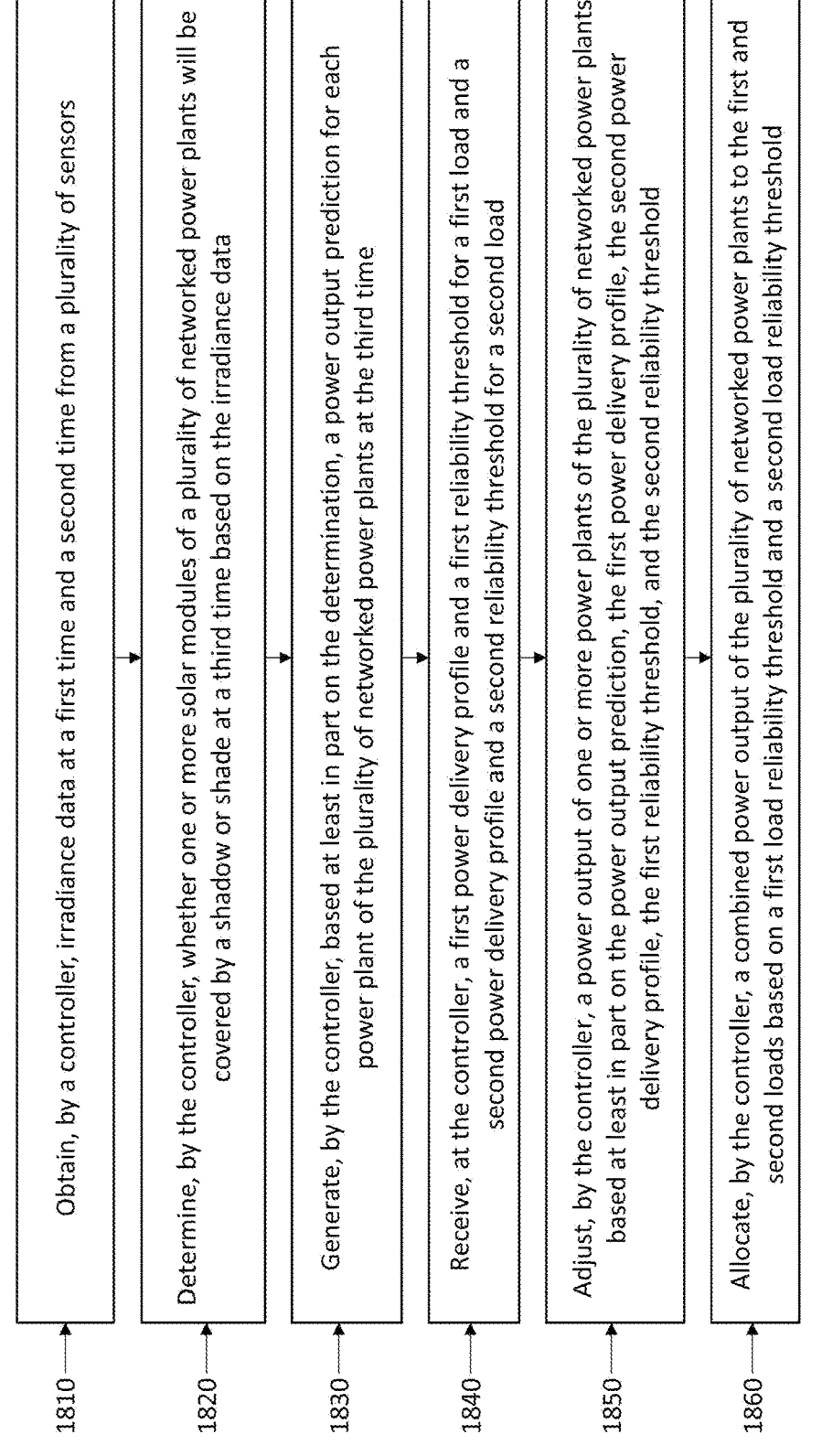

1810 — Obtain, by a controller, irradiance data at a first time and a second time from a plurality of sensors 1820 — Determine, by the controller, whether one or more solar modules of a plurality of networked power plants will be covered by a shadow or shade at a third time based on the irradiance data 1830 — Generate, by the controller, based at least in part on the determination, a power output prediction for each power plant of the plurality of networked power plants at the third time 1840 — Receive, at the controller, a first power delivery profile and a first reliability threshold for a first load and a second power delivery profile and a second reliability threshold for a second load 1850 — Adjust, by the controller, a power output of one or more power plants of the plurality of networked power plants based at least in part on the power output prediction, the first power delivery profile, the second power delivery profile, the first reliability threshold, and the second reliability threshold 1860 — Allocate, by the controller, a combined power output of the plurality of networked power plants to the first and second loads based on a first load reliability threshold and a second load reliability threshold

SOLAR FORECASTING FOR NETWORKED POWER PLANTS

RELATED APPLICATIONS

This application is a continuation of International Patent Application No. PCT/US2023/013968, filed Feb. 27, 2023, which claims the benefit of and priority to U.S. application Ser. No. 17/879,270, filed Aug. 2, 2022, which claims the benefit of priority as a continuation-in-part of U.S. application Ser. No. 17/742,980 filed May 12, 2022, each of which is hereby incorporated by reference in its entirety.

BACKGROUND

Renewable energy power plants (REPPs) often have inconsistent or intermittent power outputs due to the nature of renewable energy generation. Solar power plants receive variable amounts of sunlight based on the time of day, seasonal cycles and weather patterns. Shade or shadows cast by clouds or other objects may introduce variability into power outputs that are difficult to predict. Intermittent power delivery, however, is incompatible with loads or grid systems that balance load and production on a real time basis. What is needed is more reliable power delivery from REPPs.

SUMMARY

Aspects of the present disclosure are directed to a method including obtaining irradiance data at a first time and a second time from a plurality of sensors, determining whether one or more solar modules of a plurality of networked power plants will be covered by a shadow or shade at a third time based on the irradiance data, and generating, based at least in part on the determination, a power output prediction for each power plant of the plurality of networked power plants at the third time. The method may further include receiving a first power delivery profile and a first reliability threshold for a first load, receiving a second power delivery profile and a second reliability threshold for a second load, adjusting a power output of one or more power plants of the plurality of networked power plants based at least in part on the power output prediction, the first power delivery profile, the second power delivery profile, the first reliability threshold, and the second reliability threshold, and allocating a combined power output of the plurality of networked power plants to the first and second loads.

The method may further include adjusting the power output of the one or more of the plurality of networked power plants such that the combined power output of the plurality of networked power plants satisfies the power delivery profile for the first load and the power delivery profile for the second load.

The method may further include adjusting the power output of the one or more of the plurality of networked power plants such that a variability of the combined output of the plurality of networked power plants is less than a variability of an output of each power plant of the plurality of networked power plants.

The method may further include delivering the allocated combined output to the first load and the second load via a grid, where allocating the combined power output to the first and second loads includes communicating to the first load a first amount of power delivered to the first load and communicating to the second load a second amount of power delivered to the second load.

The method may further include determining whether the one or more solar modules of the plurality of networked power plants will be covered by a shadow or shade at the third time by determining a position and a shape of the shadow or shade at the first time and the second time.

The method may further include determining whether the one or more solar modules of the plurality of networked power plants will be covered by a shadow or shade at the third time by determining a velocity of the shadow or shade.

The method may further include adjusting the power output of the one or more power plants of the plurality of networked power plants by adjusting a charge/discharge of an energy storage system (ESS) of the one or more power plants of the plurality of networked power plants.

Aspects of the present disclosure are directed to a system including a controller configured to obtain irradiance data at a first time and a second time from a plurality of sensors, determine whether one or more solar modules of a plurality of networked power plants will be covered by a shadow or shade at a third time based on the irradiance data, and generate, based at least in part on the determination, a power output prediction for each power plant of the plurality of networked power plants at the third time. The controller may be further configured to receive a power delivery profile for a first load, receive a power delivery profile for a second load, adjust a power output of one or more power plants of the plurality of networked power plants based at least in part on the power output prediction, the power delivery profile for the first load, and the power delivery profile for the second load, and allocate a combined power output of the plurality of networked power plants to the first and second loads.

The controller may be further configured to adjust the power output of the one or more of the plurality of networked power plants such that the combined power output of the plurality of networked power plants satisfies the power delivery profile for the first load and the power delivery profile for the second load.

The controller may be further configured to adjust the power output of the one or more of the plurality of networked power plants such that a variability of the combined output of the plurality of networked power plants is less than a variability of an output of each power plant of the plurality of networked power plants.

The controller may be further configured to deliver the allocated combined output to the first load and the second load via a grid, where the controller is configured to allocate the combined power output to the first and second loads by communicating to the first load a first amount of power delivered to the first load and communicating to the second load a second amount of power delivered to the second load.

The controller may be configured to determine whether the one or more solar modules of the plurality of networked power plants will be covered by a shadow or shade at the third time by determining a position and a shape of the shadow or shade at the first time and the second time.

The controller may be configured to determine whether the one or more solar modules of the plurality of networked power plants will be covered by a shadow or shade at the third time by determining a velocity of the shadow or shade.

The controller may be configured to adjust the power output of the one or more power plants of the plurality of networked power plants by adjusting a charge/discharge of an energy storage system (ESS) of the one or more power plants of the plurality of networked power plants.

Aspects of the present disclosure are directed to a method including obtaining irradiance data at a first time and a second time from a plurality of sensors incorporated in or adjacent a first renewable energy power plant (REPP) determining, based on the irradiance data, whether one or more solar modules of a second REPP will be covered by a shadow or shade at a third time, and generating, based at least in part on the determination, a power output prediction for the second REPP. The method may further include adjusting a power of one or more of the first REPP and the second REPP based at least in part on the power output prediction for the second REPP and allocating a combined power output of the first REPP and the second REPP to a first load and a second load.

The method may further include adjusting the power output of the one or more of the first REPP and the second REPP such that the combined power output of the first REPP and the second REPP satisfies the power delivery profile for the first load and the power delivery profile for the second load.

The method may further include adjusting the power output of the one or more of the first REPP and the second REPP is adjusted such that a variability of the combined output of the first REPP and the second REPP is less than a variability of an output of the first REPP and a variability of an output of the second REPP.

The method may further include delivering the allocated combined output to the first load and the second load via a grid, where allocating the combined power output to the first and second loads includes communicating to the first load a first amount of power delivered to the first load and communicating to the second load a second amount of power delivered to the second load.

The method may further include determining whether the one or more solar modules of the plurality of networked power plants will be covered by a shadow or shade at the third time by determining a position and a shape of the shadow or shade at the first time and the second time.

The method may further include determining whether the one or more solar modules of the plurality of networked power plants will be covered by a shadow or shade at the third time by determining a velocity of the shadow or shade.

The method may further include adjusting the power output of the one or more of the first REPP and the second REPP by adjusting a charge/discharge of an energy storage system (ESS) of each of the one or more of the first REPP and the second REPP.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 2 is a flow chart of a process for controlling the power output of the solar power plant in accordance with predicted irradiance at the solar power plant, according to some embodiments of the present disclosure;

FIG. 3 is a flow chart of certain sub-operations of the process of FIG. 2, according to some embodiments of the present disclosure;

FIG. 5 is a flow chart of a process for adjusting the orientation of solar modules at the solar power plant, according to some embodiments of the present disclosure.

FIG. 16 is a flowchart of an example method for allocating power from networked power plants in accordance with one or more embodiments.

FIG. 17 is a flowchart of an example method for delivering power using a virtual power plant in accordance with one or more embodiments.

FIG. 18 is a flowchart of an example method for delivering power from networked power plants using solar forecasting.

DETAILED DESCRIPTION

Aspects of the present disclosure provide systems and methods for forecasting short-term variations in the output of a solar power plant due to changing atmospheric conditions. In some embodiments of the present disclosure, a system obtains irradiance data from a plurality of sensors disposed among or adjacent to a plurality of solar modules of the power plant. The system can obtain the irradiance data continuously or at regular intervals. If the irradiance measured by a particular sensor is less than the irradiance measured by other sensors in the area, the solar modules near that sensor may be covered by a shadow (e.g., a cloud shadow) or shade. The system can process irradiance data collected at a first time and at a second time to generate an output that indicates whether one or more solar modules of the plurality of solar modules will be covered by a shadow at a third time.

The output may be a data structure containing the predicted irradiance of each solar module at the third time. The system can use this output to more accurately predict the instantaneous power output of the solar power plant at the third time.

Figure 1:
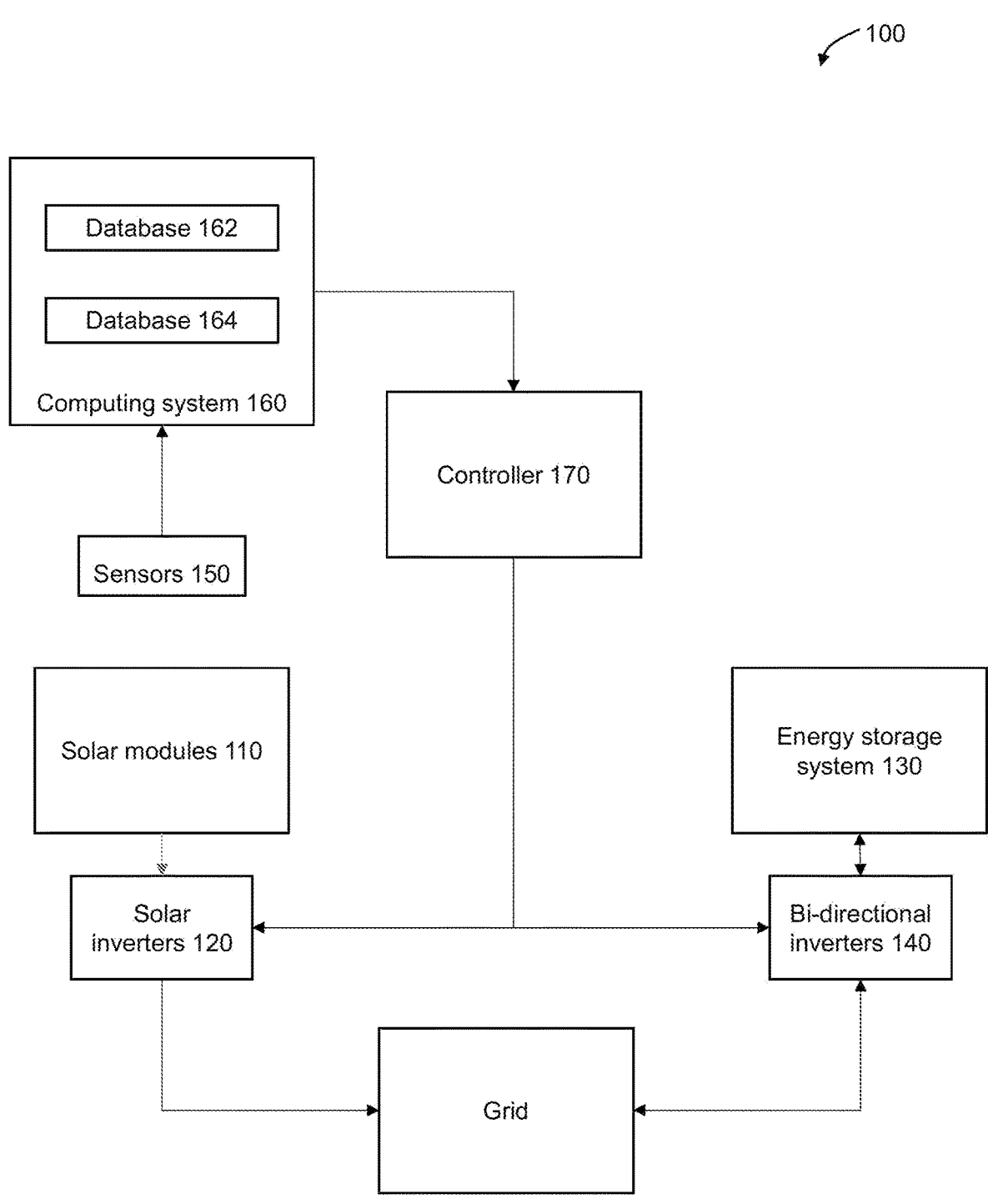
FIG. 1 schematically illustrates a solar power plant, according to some embodiments of the present disclosure.

FIG. 1 schematically illustrates a solar power plant 100, according to some embodiments of the present disclosure. The solar power plant 100 may have solar modules 110, solar inverters 120, an energy storage system 130, bi-directional inverters 140, sensors 150, a computing system 160, and a controller 170. The solar modules 110 and the energy storage system 130 may be connected to the grid through the inverters 120 and the bi-directional inverters 140.

The solar modules 110 may be arranged in a grid. Each solar module may have one or more photovoltaic cells that convert light to electric power. The photovoltaic cells may be multi-, mono- or amorphous silicon cells, cadmium telluride cells, perovskite cells, or the like. The photovoltaic cells may be single junction or multi-junction cells. The solar modules 110 may be mono-facial or bifacial.

The inverters 120 may be direct current-to-alternating current (DC-to-AC) inverters. The inverters 120 can convert DC power generated by the solar modules 110 to AC power for the grid.

The energy storage system 130 may be a compressed air system, a pumped water system, or a battery-based system. The energy storage system 130 can store excess power generated by the solar modules 110 or available from the grid (e.g., during low demand periods). Additionally or alternatively, the energy storage system 130 can be discharged in order to provide additional power to the grid (e.g., when grid demand is high, or when the power output of the solar modules is low). The bi-directional inverters 140 may be DC-to-AC and AC-to-DC inverters, that facilitate discharging and charging of the energy storage system 130, respectively.

The sensors 150 may include irradiance meters. The sensors 150 may also include wind speed sensors, precipitation sensors, humidity sensors, and the like. The sensors 150 may be communicatively coupled to the computing system 160. The computing system 160 may have a database 162 and a processor 164. The computing system 160 can store the data generated by the sensors 150 in the database 162. The processor 164 can obtain the data from the database 162 and process the data to generate predictions, including irradiance and/or cloud predictions, power predictions, and the like. The process of generating these predictions is described in greater detail in FIGS. 2-5. The controller 170 can use the predictions generated by the computing system 160 to control the power output of the solar modules 110 and the energy storage system 130. For example, if the predictions indicate that cloud coverage will reduce the power output of the solar modules 110, the controller 170 can send control signals that cause the energy storage system 130 and bi-directional inverters 140 to discharge power to the grid. Or, if the predictions indicate that the solar modules 110 will generate excess power, the controller 170 can send control signals that cause one or more of the solar modules 110 to disconnect from the grid and connect instead to the energy storage system 130 to charge the energy storage system 130 with the excess power. The controller 170 can also control the orientation of the solar panels.

The computing system 160 can be implemented on one or more computing devices. The computing devices can be servers, desktop or laptop computers, electronic tablets, mobile devices, or the like. The computing devices can be located in one or more locations. The computing devices can have general-purpose processors, graphics processing units (GPU), application-specific integrated circuits (ASIC), field-programmable gate-arrays (FPGA), or the like. The computing devices can additionally have memory, e.g., dynamic or static random-access memory, read-only memory, flash memory, hard drives, or the like. The memory can be configured to store instructions that, upon execution, cause the computing devices to implement the functionality of the subsystems. The computing devices can additionally have network communication devices. The network communication devices can enable the computing devices to communicate with each other and with any number of user devices, over a network. The network can be a wired or wireless network. For example, the network can be a fiber optic network, Ethernet® network, a satellite network, a cellular network, a Wi-Fi® network, a Bluetooth® network, or the like. In other implementations, the computing devices can be several distributed computing devices that are accessible through the Internet. Such computing devices may be considered cloud computing devices.

FIG. 2 is a flow chart of a process 200 for controlling the power output of a solar power plant in accordance with predicted irradiance at the power plant, according to some embodiments of the present disclosure. The process 200 can be performed by a system of one or more appropriately programmed computers in one or more locations (e.g., the computing system 160 and the controller 170 of FIG. 1).

The solar power plant may have plurality of solar modules. The solar modules may be arranged in a grid. Each solar module may have one or more photovoltaic cells that convert light to electric power. The photovoltaic cells may be multi-, mono- or amorphous silicon cells, cadmium telluride cells, perovskite cells, or the like. The photovoltaic cells may be single junction or multi-junction cells. The solar modules may be mono-facial or bifacial. The solar modules may also have power electronics. For example, each solar module- or a subset of solar modules—may have a DC-to-DC converter and an inverter. The DC-to-DC converters can adjust the voltage of the DC power generated by the solar modules, and the inverters can convert the DC power generated by the solar modules to AC power. Each solar module may also have a controller and a motor for adjusting the orientation of the solar module with respect to the sun.

The solar power plant may also have an energy storage system. The energy storage system may be a compressed air system, a pumped water system, or a battery-based system, for example. The energy storage systems can store excess power generated by the solar power plant when grid demand is low and supplement power generated by the solar modules when grid demand is high.

In an operation of the process 200, the system can obtain irradiance data from a plurality of sensors at a first time and at a second time (210). The sensors may be disposed among or adjacent to the solar modules. For example, the sensors may be disposed between the solar modules and along or adjacent to the perimeter of the grid of solar modules. There may be at least about 1 solar module per sensor, 2 solar modules per sensor, 3 solar modules per sensor, 4 solar modules per sensor, 5 solar modules per sensor, 10 solar modules per sensor, 20 solar modules per sensor, or more. The sensors may be irradiance meters. Alternatively, the inverters that are used to covert the DC power generated by the solar modules to AC power may be used as sensors. The inverters may be disposed among the array of solar modules, and a particular inverter may be connected to a subset of adjacent solar modules. The inverters may have built-in sensors that are configured to measure electric power. For example, the sensors may be components of a supervisory control and data acquisition (SCADA) system of the inverters. The irradiance of the solar modules that are connected to a particular inverter can be inferred from the power output of that inverter. The use of inverters as sensors may be advantageous because it may allow the implementation of the forecasting system described herein without specialized or dedicated hardware.

The second time may be at least about 1 minute, 2 minutes, 3 minutes, 4 minutes, 5 minutes, 10 minutes, 15 minutes, 30 minutes, 45 minutes, 1 hour, or more after the first time. The second time may be at most about 1 hour, 45 minutes, 30 minutes, 15 minutes, 10 minutes, 5 minutes, 4 minutes, 3 minutes, 2 minutes, 1 minute, or less after the first time.

The system can process the irradiance data at the first time and the second time to generate an output that indicates whether one or more solar modules will be covered by a shadow or shade at a third time (220). The shadow may be caused by a cloud or other atmospheric condition or phenomena (e.g., fog, dust, smog, or the like). The output may be or include a data structure that comprises the predicted or expected irradiance of each solar module at the third time. The data structure may be a map that is superimposed on a representation of the grid of solar modules. Alternatively, the output may merely indicate which solar modules are expected to be covered by the shadow.

The third time may be at least about 1 minute, 2 minutes, 3 minutes, 4 minutes, 5 minutes, 10 minutes, 15 minutes, 30 minutes, 45 minutes, 1 hour, 2 hours, or more after the second time. The second time may be at most about 2 hours, 1 hour, 45 minutes, 30 minutes, 15 minutes, 10 minutes, 5 minutes, 4 minutes, 3 minutes, 2 minutes, 1 minute, or less after the second time.

FIG. 3 is a flow chart of the sub-operations of operation 220, according to some embodiments of the present disclosure. The system can determine the position and shape of the shadow at the first time (310). Determining the position and shape of the shadow may comprise determining the edges of the shadow, including the leading and trailing edges and any other edges. The system can determine the edges of the shadow by processing the irradiance data with an edge detection algorithm. The edge detection algorithm may compute derivatives of the irradiance values in the irradiance data to determine locations in which the irradiance values exhibit a high rate of change. Such locations may correspond to the edges of the shadow. Alternatively, the edge detection algorithm may be a supervised machine learning algorithm (e.g., a convolutional neural network). The supervised machine learning algorithm may be trained to detect the edges of the shadow. The supervised machine learning algorithm may be trained on labeled training examples. The labeled training examples may be, for example, maps of irradiance data in which the edges of the shadows or shade have been identified. The system can then determine the position and shape of the shadow at the second time (320). Operation 320 may be substantially the same as operation 310.

Based on the position and shape of the shadow at the first time, the position and shape of the shadow at the second time, and the difference between the first time and the second time, the system can determine the velocity of the shadow (330). The system can predict the position and shape of the shadow at the third time based at least in part on its velocity and its position and shape at the second time (340). Determining the position and shape at the third time may comprise applying an inertia model or vector analysis to the velocity and the position at the second time. In predicting the position and shape of the shadow at the third time, the system can also consider the current wind speed.

Based at least in part on the predicted position and shape of the shadow at the third time, the system can generate the output that indicates whether one or more solar modules will be covered by the shadow at the third (350). As mentioned above, the output may be or include a data structure that comprises the predicted or expected irradiance of each solar module at the third time. The expected irradiance of a particular solar module at the third time may be inferred from the actual irradiance of a similarly-situated solar module at the second time (e.g., from the actual irradiance of a solar module that was covered by the same shadow that is expected to cover the particular solar module at the third time). Alternatively, the output may merely indicate which solar modules are expected to be covered by the shadow.

Figure 4:
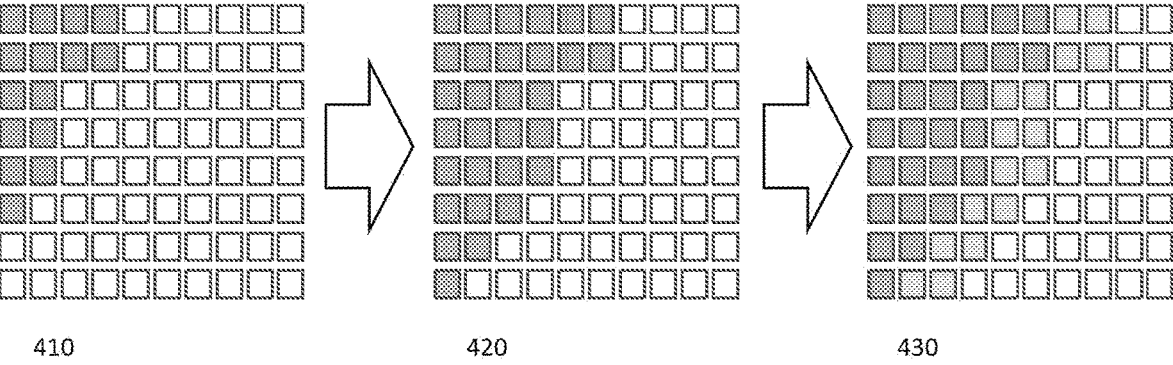
FIG. 4 graphically illustrates the process of FIG. 3.

FIG. 4 graphically illustrates the process 300. 410 represents the output of an array of irradiance meters at a first time, with the shaded boxes representing lower irradiance values. 420 represents the output of the array of irradiance meters at a second time. In 420, additional boxes are shaded, indicating the movement of shadow to right. 430 represents predicted irradiance values at a third time.

Returning to FIG. 2, the system can generate a prediction of the power output of the solar power plant at the third time based at least in part on the output generated in operation 220 (230). In general, the power output of a particular solar module may be defined by the equation:

$$P = A \times I \times R \times PR,$$

where P is the power output of the solar module in watts, A is the area of the solar module in square meters, I is the irradiance of the solar module in watts per square meter, R is the yield of the solar module, and PR is the performance ratio. The yield of the solar module may be the efficiency of the solar module in converting light to power. The performance ratio of the solar module may account for other types of losses, including inverter losses, temperature losses, cable losses, and the like. The yield and performance ratios of the solar modules may be determined empirically. The yield and performance ratios may vary depending on the age of the solar modules and numerous other factors (e.g., irradiance). Such factors may be considered when computing the expected power outputs of the solar modules.

The power output of the solar power plant may be the sum of the power outputs of the individual solar modules. To predict the power output of the solar power plant at the third time, the system can use the predicted irradiance of each solar module at the third time in the above-mentioned equation.

In some cases, the predicted power output of the solar power plant at the third time may be different than the actual power output of the power plant at the second time. For example, the predicted power output at the third time may be less than the actual power output at the second time due to an incoming cloud shadow. Alternatively, the predicted power output at the third time may be greater than the actual power output of the power plant at the second time due to an outgoing cloud shadow. It may be desirable to prevent a change in the power output of the power plant or to increase or decrease the power output slowly rather than abruptly.

Accordingly, in some embodiments, the system can take one or more actions to (i) prevent the power output of the power plant from changing or (ii) reduce the rate of change of the power output (240). For example, the system can send a control signal to an energy storage system at the power plant. The control signal may cause the energy storage system to store excess power generated by the solar modules, or it may cause the energy storage system to provide power to supplement the power generated by the solar modules. Utilizing the energy storage system in this way may ensure that the power output of the solar power plant remains steady over time. In some cases, an increase or decrease in the power output of the solar power plant may be acceptable. In such cases, the energy storage system may be used to slowly ramp the power output of the solar power plant up or down, which may be more desirable than an abrupt change. Even in the absence of an energy storage system, the power output of the solar array itself can be reduced to less than it is capable of delivering (e.g., by instructing the inverters to limit their power output).

In some embodiments, the system can merely notify a grid operator of the expected increase or decrease in power output (250). Thereafter, the grid operator can address the change in power output as it sees fit.

The solar modules described herein may be disposed on solar trackers. The solar trackers can be used to adjust the orientation of the solar modules to minimize the angle of incidence between the solar modules and incoming sunlight. On clear days, the solar trackers may orient the solar modules so that they face the sun directly. However, on cloudy days, the solar trackers may instead orient the solar modules parallel to the ground, because the intensity of diffuse light may exceed the intensity of direct light on cloudy days.

The solar trackers may allow the solar modules to rotate about one or two axes. The solar trackers may have motors to facilitate the rotation. A solar tracking algorithm may control the motors. The solar tracking algorithm may be a date and time-based algorithm, or it may use sensor inputs. The solar tracking algorithm may be a machine learning algorithm. For example, the solar tracking algorithm may be a reinforcement learning algorithm.

FIG. 5 is a flow chart of a process 500 for adjusting the orientation of solar modules, according to some embodiments of the present disclosure. The process 500 can be performed by a system of one or more appropriately programmed computers in one or more locations (e.g., the computing system 160 and the controller 170 of FIG. 1).

The system can obtain irradiance data from a plurality of sensors at a first time and at a second time (510). The sensors may be irradiance meters. Additionally or alternatively, the inverters that convert DC power generated by the solar modules to AC power may serve as sensors. Operation 510 of the process 500 may be substantially the same as the operation 210 of the process 200.

The system can process the irradiance data at the first time and the second time to generate an output that indicates whether one or more solar modules will be covered by a shadow or shade at a third time (520). The output may be or include a data structure that comprises the predicted or expected irradiance of each solar module at the third time. The data structure may be a map that is superimposed on a representation of the grid of solar modules. Alternatively, the output may merely indicate which solar modules are expected to be covered by the shadow. Operation 520 of the process 500 may be substantially the same as the operation 510 of the process 200.

The system can then use the output of operation 520 as input to the solar tracking algorithm described above (530). The output of the solar tracking algorithm may be a control signal that causes one or more solar trackers to adjust the orientation of one or more solar modules based on predicted cloud patterns. If the system predicts that particular solar modules will be covered by a cloud shadow at a future time, the solar tracking algorithm can adjust the orientation of those solar modules to be substantially parallel to the ground. This may be desirable because the intensity of diffuse light may exceed the intensity of direct light in cloudy conditions. If the system predicts that particular solar modules will not be covered by a cloud shadow at a future time, the solar tracking algorithm can adjust the orientation of those solar modules to be perpendicular to the sun. If the system predicts partial or broken cloud cover, the solar tracking algorithm can adjust the orientation of the solar modules to face bright areas between clouds. The system can make these adjustments immediately prior to the leading or trailing edge of a cloud shadow reaching the relevant solar modules. In some cases, the velocity of clouds may be so high that it is impossible or uneconomic to adjust the orientation of the solar modules. In such cases, solar tracking may be halted.

Machine Learning

The present disclosure describes an edge detection algorithm for detecting the edges of a cloud shadow. The edge detection algorithm may be a supervised machine learning algorithm. The supervised machine learning algorithm may be trained on historical data. The historical data may include (i) instances of irradiance data at a particular time and (ii) for each instance, the manually identified edges of any cloud shadows in the irradiance data. The supervised machine learning algorithm may be trained by providing the instances of irradiance data to an untrained or partially trained version of the algorithm to generate predicted outputs that indicate the edges of any cloud shadows in the irradiance data. The predicted outputs can be compared to the known outputs (i.e., the manually identified edges of any cloud shadows in the irradiance data), and if there is a difference, the parameters of the supervised machine learning algorithm can be updated. The supervised machine learning algorithm may be a regression algorithm, a support vector machine, a decision tree, a neural network, or the like. In cases in which the machine learning algorithm is a regression algorithm, the weights may be regression parameters.

In some cases, the supervised machine learning algorithm may be a neural network. Neural networks may employ multiple layers of operations to predict one or more outputs, e.g., the edge of a shadow. Neural networks may include one or more hidden layers situated between an input layer and an output layer. The output of each layer can be used as input to another layer, e.g., the next hidden layer or the output layer. Each layer of a neural network may specify one or more transformation operations to be performed on input to the layer. Such transformation operations may be referred to as neurons. The output of a particular neuron may be a weighted sum of the inputs to the neuron, adjusted with a bias and multiplied by an activation function, e.g., a rectified linear unit (ReLU) or a sigmoid function. Training a neural network may involve providing inputs to the untrained neural network to generate predicted outputs, comparing the predicted outputs to expected outputs, and updating the algorithm's weights and biases to account for the difference between the predicted outputs and the expected outputs. Specifically, a cost function may be used to calculate a difference between the predicted outputs and the expected outputs. By computing the derivative of the cost function with respect to the weights and biases of the network, the weights and biases may be iteratively adjusted over multiple cycles to minimize the cost function. Training may be complete when the predicted outputs satisfy a convergence condition, e.g., a small magnitude of calculated cost as determined by the cost function.

The neural network may be a convolutional neural network (CNN). CNNs are neural networks in which neurons in some layers, called convolutional layers, receive input from only a small portion of the input data set (e.g., a small area of irradiance data). These small portions may be referred to as the neurons' receptive fields. Each neuron in such a convolutional layer may have the same weights. In this way, the convolutional layer can detect certain features in any portion of the input data set. CNNs may also have pooling layers that combine the outputs of neuron clusters in convolutional layers and fully connected layers that are similar to traditional layers in a feed-forward neural network. CNNs may be particularly adept at classifying images or image-like data (e.g., a map of irradiance data).

Alternatively, the edge detection algorithm may be an unsupervised machine learning algorithm. The unsupervised machine learning algorithm may be capable of identifying patterns in irradiance data (e.g., areas of the irradiance data that exhibit a high rate of change). The unsupervised machine learning algorithm may be a clustering algorithm, an isolation forest, an autoencoder, or the like.

The present disclosure also describes a solar tracking algorithm. The solar tracking algorithm may be a reinforcement learning algorithm. The reinforcement learning algorithm may seek an optimal solution to a problem by balancing exploration of uncharted territory with exploitation of current knowledge. In reinforcement learning, labeled input-output pairs need not be used. Instead, an action is chosen from a set of available actions. The action may result in a new environmental state (i.e., a new solar module orientation). The new environmental state may have a reward associated with it, and the reward may be positive or negative depending on whether the new state is better (i.e., if the solar module generates more power) or worse (i.e., if the solar module generates less power) than the previous state. The goal of the agent may be to collect as much reward as possible, i.e., optimize the output power of the solar module.

Computer Systems

Figure 6:
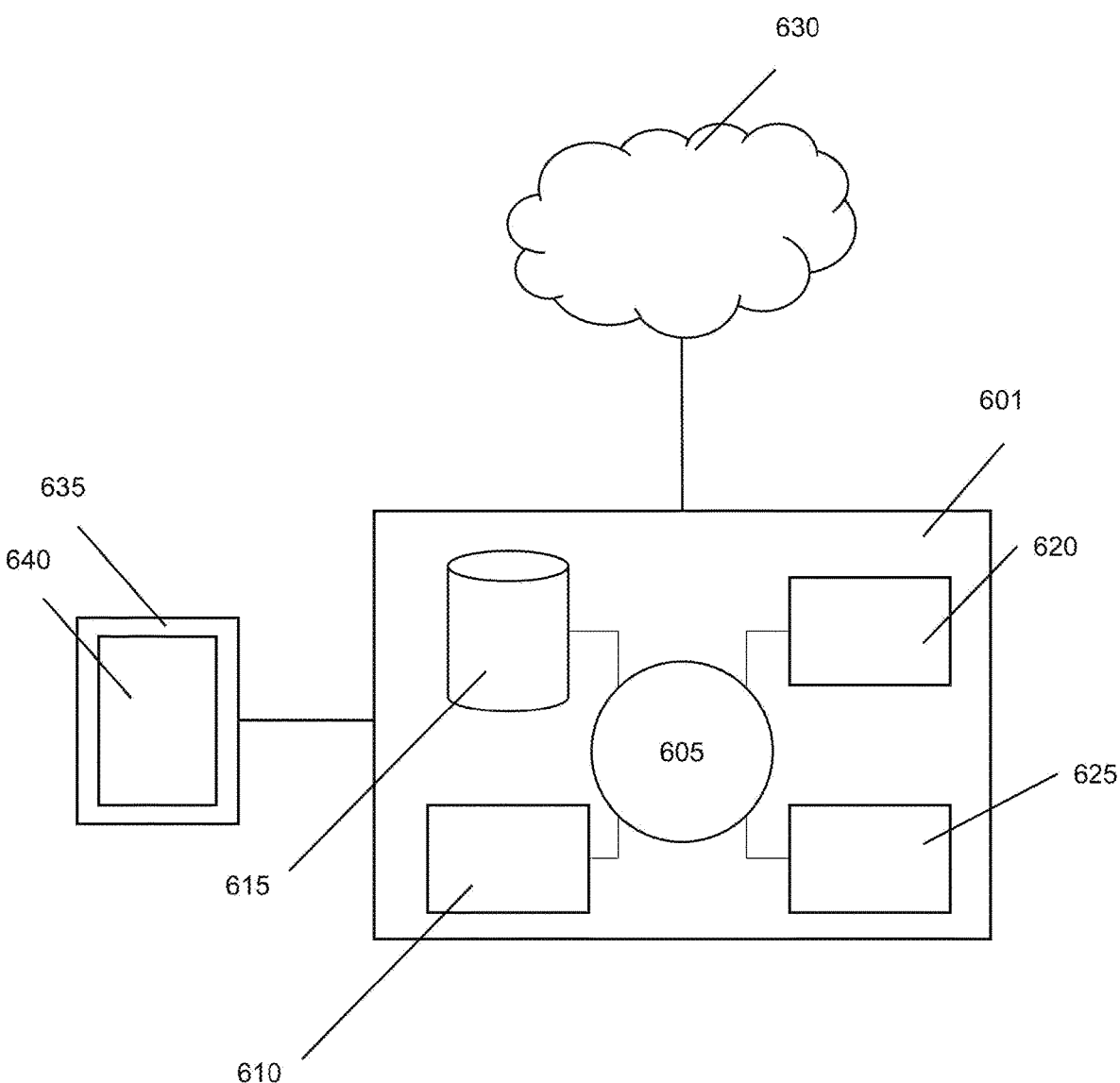
FIG. 6 shows a computer system that is programmed or otherwise configured to implement methods provided herein.

The present disclosure provides computer systems that are programmed to implement methods of the disclosure. FIG. 6 shows a computer system 601 that is programmed or otherwise configured to generate an output that indicates whether one or more solar modules will be covered by a shadow or shade, and to use the output to predict the power output of a solar plant or adjust the orientation of the solar modules. The computer system 601 can be an electronic device of a user or a computer system that is remotely located with respect to the electronic device. The electronic device can be a mobile electronic device.

The computer system 601 includes a central processing unit (CPU, also "processor" and "computer processor" herein) 605, which can be a single core or multi core processor, or a plurality of processors for parallel processing. The computer system 601 also includes memory or memory location 610 (e.g., random-access memory, read-only memory, flash memory), electronic storage unit 615 (e.g., hard disk), communication interface 620 (e.g., network adapter) for communicating with one or more other systems, and peripheral devices 625, such as cache, other memory, data storage and/or electronic display adapters. The memory 610, storage unit 615, interface 620 and peripheral devices 625 are in communication with the CPU 605 through a communication bus (solid lines), such as a motherboard. The storage unit 615 can be a data storage unit (or data repository) for storing data. The computer system 601 can be operatively coupled to a computer network ("network") 630 with the aid of the communication interface 620. The network 630 can be the Internet, an internet and/or extranet, or an intranet and/or extranet that is in communication with the Internet. The network 630 in some cases is a telecommunication and/or data network. The network 630 can include one or more computer servers, which can enable distributed computing, such as cloud computing. The network 630, in some cases with the aid of the computer system 601, can implement a peer-to-peer network, which may enable devices coupled to the computer system 601 to behave as a client or a server.

The CPU 605 can execute a sequence of machine-readable instructions, which can be embodied in a program or software. The instructions may be stored in a memory location, such as the memory 610. The instructions can be directed to the CPU 605, which can subsequently program or otherwise configure the CPU 605 to implement methods of the present disclosure. Examples of operations performed by the CPU 605 can include fetch, decode, execute, and writeback.

The CPU 605 can be part of a circuit, such as an integrated circuit. One or more other components of the system 601 can be included in the circuit. In some cases, the circuit is an application specific integrated circuit (ASIC).

The storage unit 615 can store files, such as drivers, libraries and saved programs. The storage unit 615 can store user data, e.g., user preferences and user programs. The computer system 601 in some cases can include one or more additional data storage units that are external to the computer system 601, such as located on a remote server that is in communication with the computer system 601 through an intranet or the Internet.

The computer system 601 can communicate with one or more remote computer systems through the network 630. For instance, the computer system 601 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 601 via the network 630.

Methods as described herein can be implemented by way of machine (e.g., computer processor) executable code stored on an electronic storage location of the computer system 601, such as, for example, on the memory 610 or electronic storage unit 615. The machine executable or machine-readable code can be provided in the form of software. During use, the code can be executed by the processor 605. In some cases, the code can be retrieved from the storage unit 615 and stored on the memory 610 for ready access by the processor 605. In some situations, the electronic storage unit 615 can be precluded, and machine-executable instructions are stored on memory 610.

The code can be pre-compiled and configured for use with a machine having a processer adapted to execute the code or can be compiled during runtime. The code can be supplied in a programming language that can be selected to enable the code to execute in a pre-compiled or as-compiled fashion.

Aspects of the systems and methods provided herein, such as the computer system 601, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 601 can include or be in communication with an electronic display 635 that comprises a user interface (UI) 640. Examples of UI's include, without limitation, a graphical user interface (GUI) and web-based user interface.

Embodiments of the present disclosure allow an operator of networked REPPs to deliver power with greater reliability. Combining the outputs of REPPs whose outputs are not entirely correlated results in a combined output with a variability and intermittency lower than the variabilities and intermittencies of the outputs of the individual REPPs. This means that power can be delivered more consistently by networked REPPs than by individual REPPs. Additionally, some load operators may want to use only renewable energy but may require consistent power delivery. These load operators may want to receive power over a grid and only use renewable energy. These load operators may correlate their power usage with renewable power production in order to only use renewable energy. These load operators may send a power delivery profile to a renewable energy source representing a request for amounts of renewable power production at different times. If the power delivery profile of a load is satisfied, the load operator can claim to only use renewable energy for the load. The REPP output allocated to a load may be thought of as an overlay on top of the rest of the power delivered on the grid because it is considered to be produced at the REPP and delivered to the load, ignoring the inevitable commingling of power on the grid from different sources. The output is effectively produced at the REPP and delivered to the load, despite the inevitable commingling of power on the grid from different sources To consistently satisfy the power delivery profile, consistent power delivery is required. Individual REPPs may struggle to provide consistent power delivery. This means that some loads may have to use some power from non-renewable power sources or the REPP may have to have a power capacity greatly exceeding the power delivery profile of a load in order to consistently satisfy the load's power delivery profile despite fluctuations in power generation. Networked REPPs may be able to provide more-consistent power that comes entirely from renewable power sources. Additionally, and/or alternatively, each REPP may have a power capacity lower than what would be needed for a single REPP to provide consistent power. Each REPP having a lower power capacity than what a single, un-networked REPP would need to provide consistent power results in increases in efficiency and lower costs for constructing REPPs due to each REPP needing less excess capacity which would usually not be fully utilized. Networked REPPs may also produce power in excess of what is required by various loads. This excess power may be treated as a virtual REPP, or virtual power plant which can deliver power to additional loads.

The outputs of networked REPPs and virtual power plants may be delivered over the grid and allocated to various loads. This allocated combined output of networked REPPs may be thought of as an overlay on top of the rest of the power delivered on the grid because it is effectively produced at the networked REPPs and delivered to the various loads to which it is allocated, ignoring the inevitable commingling of power on the grid from different sources. This overlay may be treated as a green grid, utilizing the existing infrastructure of the grid, but delivering renewable power from REPPs to the various loads. The green grid may function similar to the grid on which it operates, with a market for renewable power distinct from a market for conventional power. The green grid may be owned and operated by one entity, or it may include REPPs owned and operated by a variety of entities.

Figure 7:
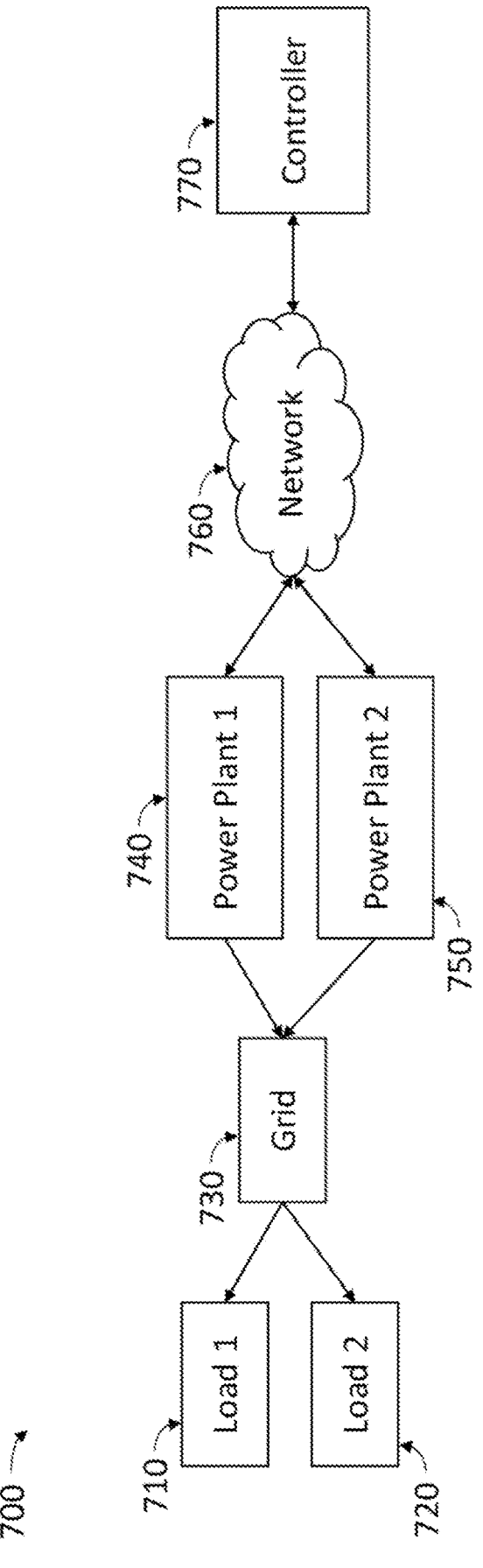
FIG. 7 illustrates an example environment in accordance with one or more embodiments.

FIG. 7 illustrates an example environment 700 in accordance with one or more embodiments. The environment 700 may include a first load 710, a second load 720, a grid 730, a first power plant 740, a second power plant 750, a network 760, and a controller 770. The first load 710 and the second load 720 may be electrically coupled to the grid 730. The first load 710 and the second load 720 may be remote from each other and have separate power requirements. The first load 710 may have a first power delivery profile which details power requirements for the first load 710 at different times. The second load 720 may have a second power delivery profile which details power requirements for the second load 720 at different times. In some embodiments, the grid 730 may be a utility grid owned and operated by a single utility or system operator. In other embodiments, the grid 730 may be a plurality of electrical connections allowing for the transmission of power from the first power plant 740 and the second power plant 750 to the first load 710 and the second load 720.

The first power plant 740 may be a first renewable energy power plant (REPP). The second power plant 750 may be a second REPP. Examples of REPPs include, but are not limited to, solar plants, wind plants, geothermal plants, and biomass plants. REPPs may include energy storage systems (ESSs). An example of an ESS is a battery. A battery-based ESS may be called a batter ESS or BESS. The first power plant 740 may have a first power output that varies over time. The second power plant 750 may have a second power output that varies over time. The first power output and the second power output may vary differently such that they are not tightly correlated. For example, the first power plant 740 may be geographically remote from the second power plant 750 such that weather patterns at the first power plant 740 differ from weather patterns at the second power plant 750. Thus, variation in the first power output will not be tightly correlated with variation in the second power output. The less correlated the output of the first power plant 740 with the output of the second power plant 750, the greater the effects of networking. The less correlated the outputs of the first power plant 740 and the second power plant 750, the less variation will be present in the combined output of the first power plant 740 and the second power plant 750. Less variation in the combined output may result in more reliability in satisfying the power delivery profiles of the first load 710 and the second load 720. Less variation in the combined output may result in lower capacity requirements for the first power plant 740 and the second power plant 750.

In some embodiments, the first power plant 740 and the second power plant 750 may be selected to be networked. The first power plant 740 and the second power plant 750 may be selected for networking based on a level of correlation between the first power output and the second power output. The first power plant 740 and the second power plant 750 may be selected for networking based on a determination that the first power output and the second power output are the least correlated of a plurality of power outputs of a plurality of power plants. In some embodiments, the first power output is compared to a plurality of power outputs to select the second power output which is the least correlated with the first power output of the plurality of power outputs. In other embodiments, the first power plant 740 and the second power plant 750 may be selected by optimizing for minimized correlation from a plurality of power plants. The controller 770 may select the first power plant 740 and the second power plant 750. In some embodiments, the plurality of power outputs are available power outputs of a plurality of power plants. For example, a first power output may be less correlated with a second power output than with a third power output, but if the second power output is unavailable, the first and third power outputs may be selected for networking.

Similar network advantages may be realized by selecting loads with power requirements that are not tightly correlated. For example, a combined power delivery profile of two loads will have less variability than the individual power delivery profiles of the two loads if the individual power delivery profiles are not tightly correlated. Less variability in the combined power delivery profile allows for the combined power delivery profile to be served by a power plant or network of power plants having less excess capacity.

The first power plant 740 and the second power plant 750 may communicate with a controller 770 via a network 760. The network 760 may be any local area network (LAN) or wide area network (WAN). In some embodiments, the network is the internet. In other embodiments, the network is a private communications network. The controller may include a processor and a memory.

The controller 770 may control the first power plant 740 and the second power plant 750. The controller 770 may coordinate the first power output of the first power plant 740 and the second power output of the second power plant 750 in order to deliver power to the first load 710 and the second load 720. The controller 770 may receive the first power delivery profile of the first load 710 and the second power delivery profile of the second load 720. In some embodiments, the controller 770 receives the first power delivery profile from the first load 710 and the second power delivery profile from the second load 720 via the network 760. In other embodiments, the controller 770 receives the first power delivery profile and the second power delivery profile from another source. The controller 770 may direct the first power plant 740 to direct power to the first load 710 or the second load 720. The controller 770 may direct the second power plant 750 to direct power to the first load 710 or the second load 720. The controller 770 may direct the first power plant 740 to direct a first portion of its power output to the first load 710 and a second portion of its power output to the second load 720. The controller 770 may direct the second power plant 750 to direct a third portion of its power output to the first load 710 and a fourth portion of its power output to the second load 720. In some embodiments, directing power from a power plant to a load is accomplished by sending power from the power plant to the grid and communicating to the load how much power was sent to the grid. The load draws power from the grid equal to how much power the power plant sent to the grid. The load may match its energy consumption in a time window to the energy sent from the power plant to the grid in the time window. The time window may be a year, a month, a day, an hour, a minute, or any other unit of time. Where power is directed to the load from multiple power plants, the load may match its power consumption in a time window to the total power sent by the multiple power plants in the time window. Where the load needs to consume more energy than the total energy sent by the multiple power plants in the time window, the load operator may draw energy from other sources (which may not be renewable) and keep a record of the portion of energy consumed from the multiple power plants and from the other sources respectively, as input to an algorithm that will adjust its future requests for energy from the multiple power plants.

The controller 770 may direct the first power plant 740 and the second power plant 750 to direct power to the first load 710 and the second load 720 to satisfy the first power delivery profile and the second power delivery profile. If the power output of the first power plant 740 is sufficient to satisfy the first power delivery profile of the first load 710 and the power output of the second power plant 750 is sufficient to satisfy the second power delivery profile of the second load 720, the controller 770 may direct the first power plant 740 to direct sufficient power to the first load 710 to satisfy the first power delivery profile and direct the second power plant 750 to direct sufficient power to the second load 720 to satisfy the second power delivery profile. If the power output of the first power plant 740 is insufficient to satisfy the first power delivery profile of the first load 710 and the power output of the second power plant 750 is sufficient to satisfy the second power delivery profile of the second load 720, the controller 770 may direct the first power plant 740 to direct its power output to the first load 710 and direct the second power plant 750 to direct sufficient power to the second load 720 to satisfy the second power delivery profile and an amount of power to the first load 710 sufficient, when combined with the power output of the first power plant 740, to satisfy the first power delivery profile of the first load 710. Since the power outputs of the first power plant 740 and the second power plant 750 are not correlated, it is likely that if the power output of the first power plant 740 is insufficient to satisfy the first power delivery profile, the second power plant 750 has sufficient power output in excess of what is require by the second power delivery profile to supplement the power output of the first power plant 740 to satisfy the first power delivery profile.

Figure 8:
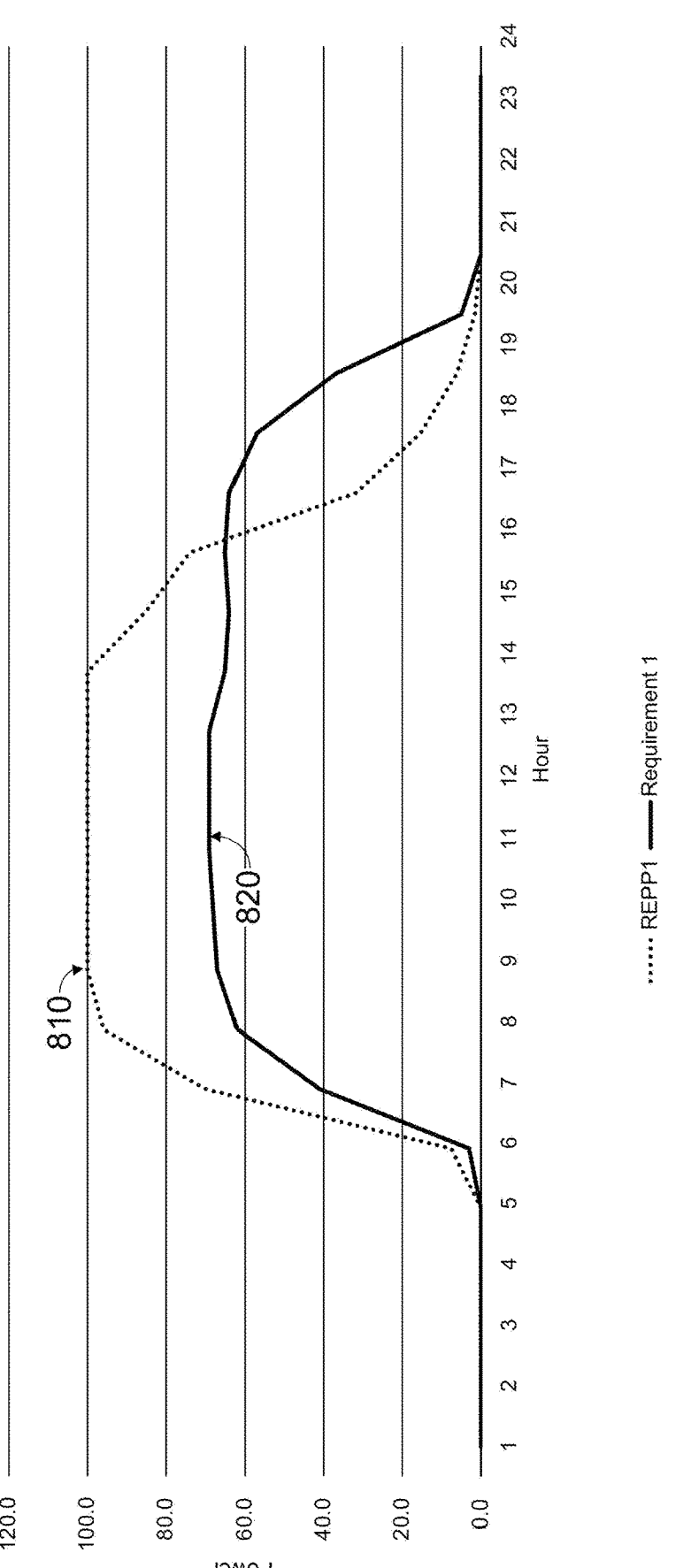
FIG. 8 illustrates a first renewable energy power plant (REPP) output and a first power delivery profile.

FIG. 8 illustrates a first renewable energy power plant (REPP) output 810 and a first power delivery profile 820. The first REPP output 810 is shown by the dotted line and the first power delivery profile 820 is shown by the solid line. The first REPP output 810 may be the power output of the first power plant 740 of FIG. 7 and the first power delivery profile 820 may be the first power delivery profile of the first load 710 of FIG. 7. The first power delivery profile 820 represents the power requirements of the first load 710. The first REPP output 810 varies over time. When the first REPP output 810 is greater than the first power delivery profile 820, the first REPP output 810 satisfies the first power delivery profile 820. The first REPP output 810 satisfies the first power delivery profile 820 for twenty of twenty-four hours, meaning the first REPP output 810 satisfies the first power delivery profile 820 83% of the time. The first power plant 740 may be 83% reliable based on the first REPP output 810 satisfying the first power delivery profile 820 of the first load 710 83% of the time.

The first load 710 may require that the first power plant 740 satisfy the first power delivery profile 820 for a number of hours or be reliable above a threshold reliability. The first REPP output 810 may have a maximum value much greater than a maximum value of the first power delivery profile 820 in order to ensure the first power plant 740 is reliable above the threshold reliability. The maximum value of the first REPP output 810 much greater than the maximum value of the first power delivery profile 820 may be necessary to ensure the first power delivery profile 820 is satisfied given variation in the first REPP output 810.

Figure 9:
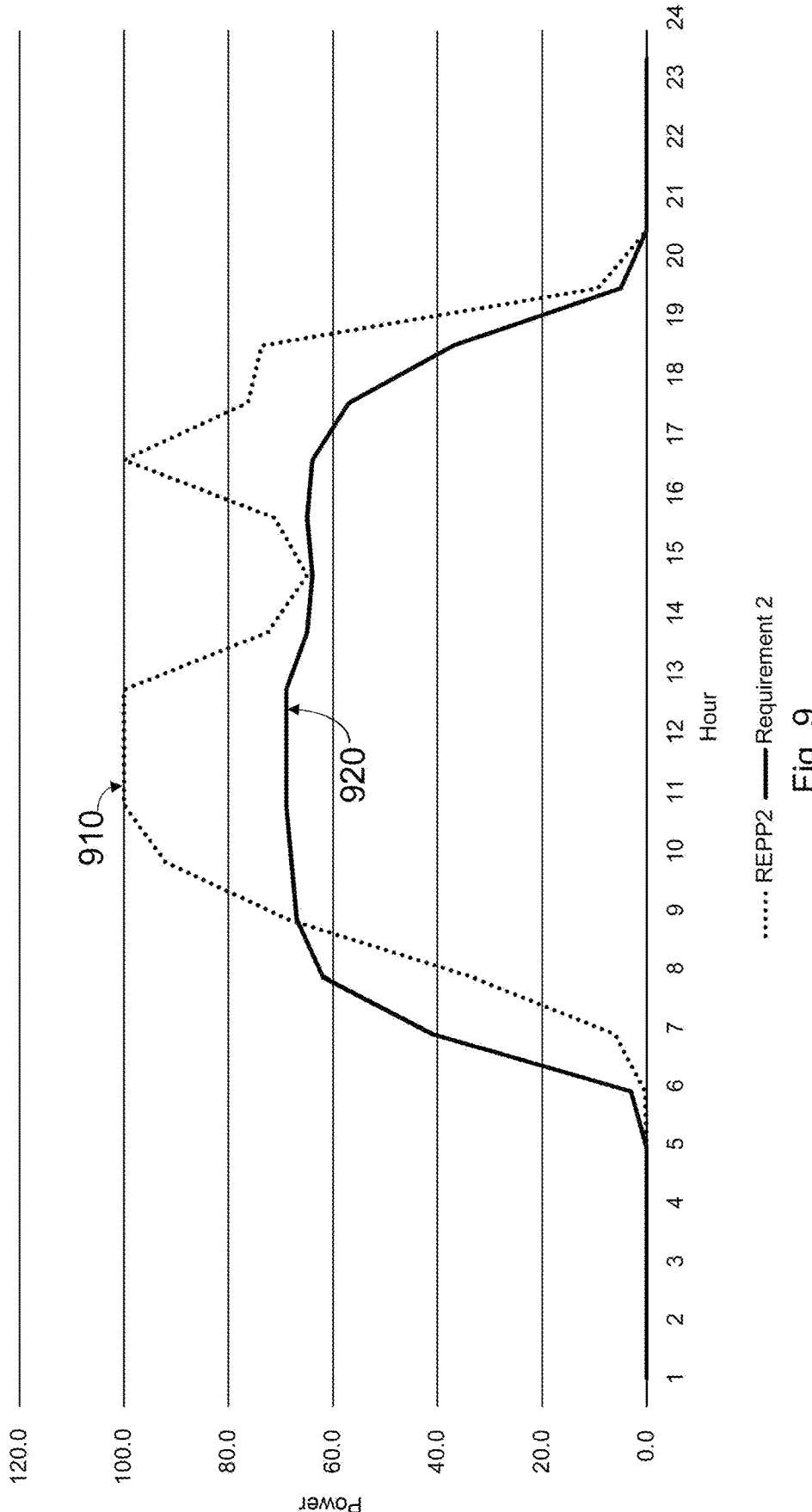
FIG. 9 illustrates a second REPP output and a second power delivery profile.

FIG. 9 illustrates a second REPP output 910 and a second power delivery profile 920. The second REPP output 910 is shown by the dotted line and the second power delivery profile 920 is shown by the solid line. The second REPP output 910 may be the power output of the second power plant 750 of FIG. 7 and the second power delivery profile 920 may be the second power delivery profile of the second load 720 of FIG. 7. While FIG. 2 illustrates the second power delivery profile 920 as being the same as the first power delivery profile 220, the first power delivery profile 220 and the second power delivery profile 920 may be different. The second power delivery profile 920 represents the power requirements of the second load 720. The second REPP output 910 varies over time. When the second REPP output 910 is greater than the second power delivery profile 920, the second REPP output 910 satisfies the second power delivery profile 920. The second REPP output 910 satisfies the second power delivery profile 920 for twenty of twenty-four hours, meaning the second REPP output 910 satisfies the second power delivery profile 920 83% of the time. The second power plant 750 may be 83% reliable based on the second REPP output 910 satisfying the second power delivery profile 920 of the second load 720 83% of the time.

The second load 720 may require that the second power plant 750 satisfy the second power delivery profile 920 for a number of hours or be reliable above a threshold reliability. The second REPP output 910 may have a maximum value much greater than a maximum value of the second power delivery profile 920 in order to ensure the second power plant 750 is reliable above the threshold reliability. The maximum value of the second REPP output 910 much greater than the maximum value of the second power delivery profile 920 may be necessary to ensure the second power delivery profile 920 is satisfied given variation in the second REPP output 910.

Figure 10:
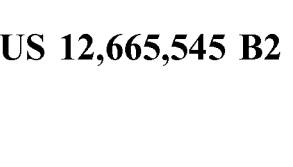
FIG. 10 illustrates a combined REPP output and a combined power delivery profile.

FIG. 10 illustrates a combined REPP output 1010 and a combined power delivery profile 1020. The combined REPP output 1010 represents a combination of the first REPP output 210 and the second REPP output 310. The combined power delivery profile 1020 represents a combination of the first power delivery profile 220 and the second power delivery profile 320. The combined REPP output 1010 satisfies the combined power delivery profile 1020 twenty-two of twenty-four hours, or 92% of the time. This means that the combined REPP output 1010 is more reliable than the first power plant 740 and the second power plant 750. This is because the first REPP output 210 and the second REPP output 310 are not exactly correlated, so there is less variability in the combined REPP output 1010 than in the first REPP output 210 and the second REPP output 310. The combined REPP output 1010 can satisfy the power delivery profiles of the first load 710 and the second load 720 more often than the first REPP output 210 and the second REPP output 310 when not combined. This means that the first load 710 and the second load 720 can more reliably receive power from the first power plant 740 and the second power plant 750.

For example, if operators of the first load 710 and the second load 720 want to use only renewable power, the first load 710 can specify its power needs in the first power delivery profile 220 and the second load 720 can specify its power needs in the second power delivery profile 320. If the first load 710 receives power only from the first power plant 740, then the first power delivery profile 220 is only satisfied 83% of the time and the first load 710 can only claim that it uses exclusively renewable power 83% of the time. The other 77% of the time, the power needs of the first load 710 must be met using other power sources connected to the grid 730. Similarly, if the second load 720 receives power only from the second power plant 750, then the second power delivery profile 320 is only satisfied 83% of the time and the second load 720 can only claim that it uses exclusively renewable power 83% of the time. The other 77% of the time, the power needs of the second load 720 must be met using other power sources connected to the grid 730. However, if the first power plant 740 and the second power plant 750 are networked and are controlled by the controller 770 via the network 760, the controller 770 can direct the combined REPP output 1010 to satisfy the combined power delivery profile 1020 92% of the time. This means that both the first load 710 and the second load 720 can claim that they use only renewable power 92% of the time if the combined REPP output 1010 is allocated equally between the first load 710 and the second load 720. The controller 770 may also allocate the combined REPP output 1010 unequally between the first load 710 and the second load 720 such that the first power delivery profile 220 profile is satisfied more than 92% of the time and the second power delivery profile 320 is satisfied less than 92% of the time. Allocating the combined REPP output 1010 between the first load 710 and the second load

720 may include notifying the first load 710 of an amount of power allocated to the first load and notifying the second load 720 of an amount of power allocated to the second load. Allocating the combined REPP output 1010 between the first load 710 and the second load 720 may include allocating a first portion of the power output of the first power plant 740 to the first load 710 and allocating a second portion of the power output of the second power plant 750 to the second load 720. The controller may store configurations of power allocation in the memory of the controller 770. The controller may store a record of amounts of power delivered by the first power plant 740 and the second power plant 750 in the memory of the controller 770.

Networking the first power plant 740 and the second power plant 750 using the controller 770 may be used to lower the initial capital expenditures of the first power plant 710 and the second power plant 750. For example, if a reliability of 83% is all that is required by the first load 710 and the second load 720, then, when networked together, the first power plant 740 and the second power plant 750 may be built with less excess capacity than is required to by 83% reliable. The first power plant 740 may have an excess capacity over the maximum value of the first power delivery profile 220 such that the first power plant 740 is 70% reliable. Similarly, the second power plant 750 may have an excess capacity over the maximum value of the second power delivery profile 320 such that the second power plant 750 is 70% reliable. This makes the first power plant 740 and the second power plant 750 cheaper to construct than if they were both 83% reliable. The combined REPP output 1010 may satisfy the combined power delivery profile 1020 83% percent of the time such that the REPP output 1010 is 83% percent reliable as required by the first load 710 and the second load 720.

In some embodiments, the combined REPP output 1010 is a combination of outputs of a plurality of REPPs. The plurality of REPPs may include any number of REPPs. The greater the number of the plurality of REPPs and the less correlated the outputs of the REPPs are, the more reliable the combined REPP output 1010 is likely to be. Additionally and/or alternatively, the greater the number of the plurality of REPPs and the less correlated the outputs of the REPPs are, the less excess power capacity each REPP requires for the combined REPP output 1010 to be reliable. For example, the first power plant 740 may be built such that the first REPP output 210 cannot satisfy the first power delivery profile of the first load 710 above a first threshold reliability and the second power plant 750 may be built such that the second REPP output 310 cannot satisfy the second power delivery profile of the second load 720 above a second threshold reliability, but the combined REPP output 1010 can still satisfy the first and second power delivery profiles above the first and second threshold reliabilities.

The above description discusses networking power plants to aggregate their output, and the same approach may be used to aggregate energy storage capacity. For example, a first energy storage system (ESS) may be sized to ensure that it can provide energy storage capacity given fluctuating demand for energy storage capacity. The first ESS may have storage capacity in excess of what is regularly expected to be required to account for large fluctuations in demand for energy storage capacity. Combining the energy storage capacity of the first ESS with the energy storage capacity of a second ESS may carry advantages similar to the advantages of combining outputs of REPPs. The combined energy storage capacity may be able to satisfy energy storage requirements more reliably than the energy storage capacity of the ESS and the energy storage capacity of the second ESS. The energy storage capacity of each of the first and second ESSs may be reduced, lowering cost, while maintaining reliability of satisfying energy storage requirements by using the combined energy storage capacity. The combined energy storage capacity in excess of requirements may be used as a virtual ESS. The virtual ESS may provide energy storage capacity to store energy from additional sources.

In an example, a first battery energy storage system (BESS) may have a first energy storage capacity and a second BESS may have a second energy storage capacity. A first power plant may have first energy storage requirements and a second power plant may have second energy storage requirements. Networking the first BESS and the second BESS may allow the first BESS and the second BESS to more reliably satisfy the first and second energy storage requirements of the first and second power plants. Alternatively, the first and second BESSs may be smaller and/or cheaper and still satisfy the first and second energy storage requirements of the first and second power plants at an acceptable reliability. A plurality of BESSs may be networked to amplify these advantages.

In another example, first and second BESSs may draw power from the grid and transfer power to the grid. The first and second BESSs may draw power from the grid when power is less expensive and transfer power to the grid when power is more expensive. Networking the first and second BESSs as disclosed herein may allow the first and second BESSs to absorb spikes of power when power is less expensive to sell when power is more expensive. Networking the first BESS and the second BESS may allow the first BESS and the second BESS to capture larger spikes of power than would be possible if not networked. Alternatively, the first and second BESSs may be smaller and/or cheaper and still capture larger spikes of power than would be possible if not networked. A plurality of BESSs may be networked to amplify these advantages.

The above description discusses networking power plants to aggregate their output, and the same approach may be used to aggregate power capacity. Operators of loads or grids may want to contract for power capacity, the ability to deliver an amount of renewable power, whether the power is ultimately delivered or not. For example, a load operator may contract for power capacity to cover a spike in power demand at the load. The power capacity is reserved for the load, and if the spike in demand occurs, the power capacity is utilized to deliver power to the load. If the spike in demand does not occur, the power capacity is not utilized to deliver power to the load. REPPs may be able to provide power capacity subject to fluctuations due to time of day, weather conditions, state of charge of energy storage systems, and other factors. For example, a first REPP may be sized to ensure that it can provide power capacity given fluctuating demand for power capacity. The first REPP may have power capacity in excess of what is regularly expected to be required in order to account for fluctuations in power capacity. Combining the power capacity of the first REPP with the power capacity of a second REPP may carry advantages similar to the advantages of combining outputs of REPPs. The combined power capacity may be able to satisfy power capacity requirements more reliably than the power capacity of the first REPP and the power capacity of the second REPP. The power capacity of each of the first and second REPPs may be reduced, lowering cost, while maintaining reliability of satisfying power capacity requirements by using the combined power capacity. The combined power capacity in excess of requirements may be used as a virtual REPP. The virtual REPP may provide power capacity to additional loads, grids, or other customers.

Figure 11:
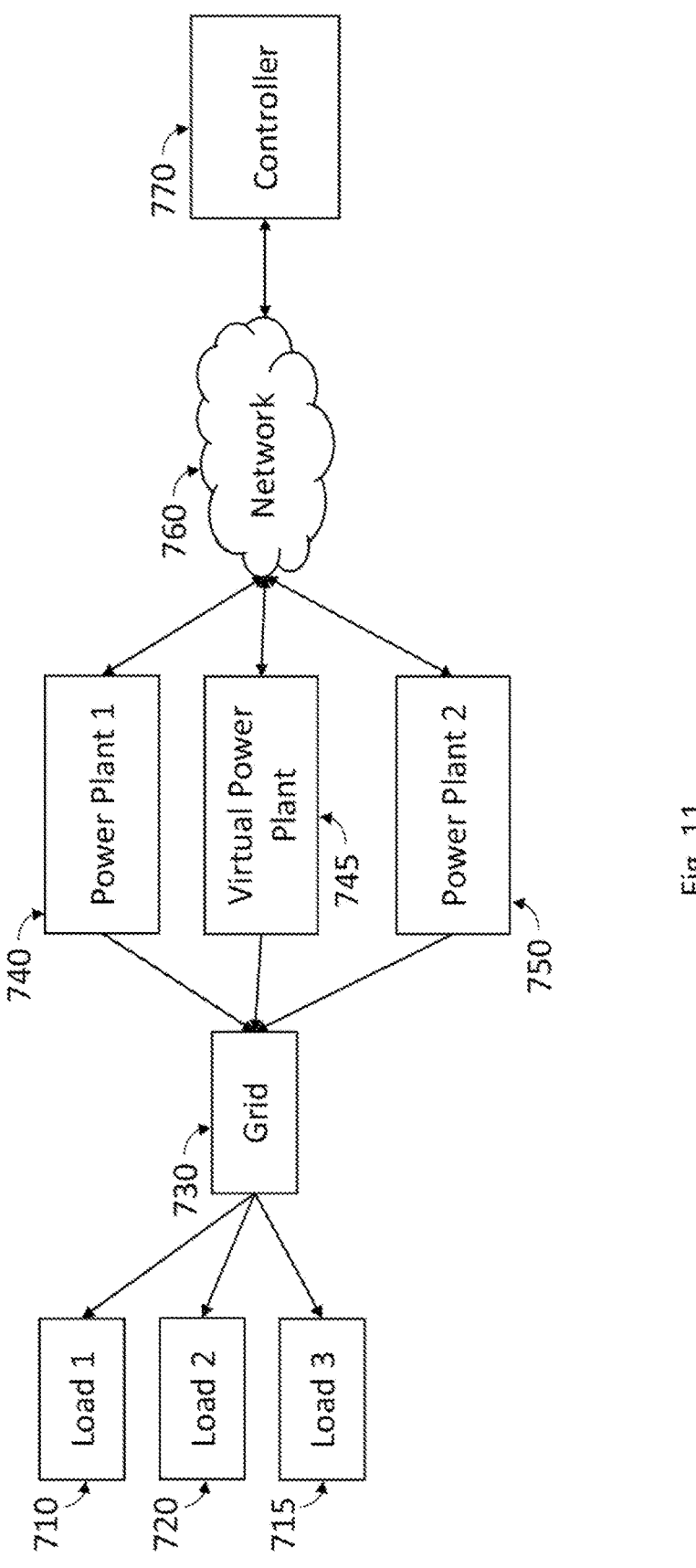
FIG. 11 illustrates another example environment in accordance with one or more embodiments.

FIG. 11 illustrates another example environment 1100 in accordance with one or more embodiments. The environment 1100 may include a first load 710, a second load 720, and a third load 715. The environment 1100 may include a grid 730, a first power plant 740, a second power plant 750, a virtual power plant 745, a network 760, and a controller 770.

The first load 710, the second load 720, and the third load 715 may be electrically coupled to the grid 730. The first load 710, the second load 720, and the third load 715 may be remote from each other and have separate power requirements. The first load 710 may have a first power delivery profile which details power requirements for the first load 710 at different times. The second load 720 may have a second power delivery profile which details power requirements for the second load 720 at different times. The third load 715 may have a third power delivery profile which details power requirements for the third load 715 at different times. In some embodiments, the grid 730 may be a utility grid owned and operated by a single utility or system operator. In other embodiments, the grid 730 may be a plurality of electrical connections allowing for the transmission of power from the first power plant 740 and the second power plant 750 to the first load 710 and the second load 720.

The first power plant 740 may be a first renewable energy power plant (REPP). The second power plant 750 may be a second REPP. The virtual power plant 745 may represent power generated by the first power plant 740 and the second power plant 750 in excess of power requirements. This excess power may be allocated to different loads, functioning as the virtual power plant 745. For example, the first power plant 740 may deliver power to satisfy the first power delivery profile, the second power plant 750 may deliver power to satisfy the second power delivery profile, and the excess combined power output of the first power plant 740 and the second power plant 750 may serve as the virtual power plant 745 and be allocated to the third load 715 to satisfy the third power delivery profile. The first power plant 740 may have a first power output that varies over time. The second power plant 750 may have a second power output that varies over time. The virtual power plant 745 may have a third power output that varies over time dependent upon the first power output, the second power output, and power requirements imposed upon the first power plant 740 and the second power plant 750. The first power output and the second power output may vary differently such that they are not tightly correlated. For example, the first power plant 740 may be geographically remote from the second power plant 750 such that weather patterns at the first power plant 740 differ from weather patterns at the second power plant 750. Thus, variation in the first power output will not be correlated with variation in the second power output.

The less correlated the output of the first power plant 740 with the output of the second power plant 750, the greater the effects of networking. The less correlated the outputs of the first power plant 740 and the second power plant 750, the less variation will be present in the combined output of the first power plant 740 and the second power plant 750. Less variation in the combined output may result in more reliability in satisfying the power delivery profiles of the first load 710 and the second load 720. Less variation in the combined output may result in lower capacity requirements for the first power plant 740 and the second power plant 750.

Less variation in the combined output may result in greater output of the virtual power plant 745.

Similar network advantages may be realized by selecting loads with power requirements that are not tightly correlated. For example, a combined power delivery profile of two loads will have less variability than the individual power delivery profiles of the two loads if the individual power delivery profiles are not tightly correlated. Less variability in the combined power delivery profile allows for the combined power delivery profile to be served by a power plant or network of power plants having less excess capacity. Less variability in the combined power delivery profile allows for a virtual power plant of a network of power plants to have greater output.

The first power plant 740 and the second power plant 750 may communicate with a controller 770 via a network 760. Since the virtual power plant 745 represents excess power output by the first power plant 740 and the second power plant 750, the controller communicates with the virtual power plant 770 by communicating with the first power plant 740 and the second power plant 750. The network 760 may be any local area network (LAN) or wide area network (WAN). In some embodiments, the network is the internet. In other embodiments, the network is a private communications network.

The controller 770 may control the first power plant 740, the second power plant 750, and the virtual power plant 745. The controller 770 may coordinate the first power output of the first power plant 740, the second power output of the second power plant 750, and the third output of the virtual power plant 745 in order to deliver power to the first load 710, the second load 720, and the third load 715. The controller 770 may receive the first power delivery profile of the first load 710, the second power delivery profile of the second load 720, and the third power delivery profile of the third load 715. In some embodiments, the controller 770 receives the first power delivery profile from the first load 710, the second power delivery profile from the second load 720, and the third power delivery profile from the third load 715 via the network 760. In other embodiments, the controller 770 receives the first power delivery profile, the second power delivery profile, and the third power delivery profile from another source. The controller 770 may direct the first power plant 740 to direct power to the first load 710 or the second load 720. The controller 770 may direct the second power plant 750 to direct power to the first load 710 or the second load 720. The controller 770 may direct the first power plant 740 to direct a first portion of its power output to the first load 710 and a second portion of its power output to the second load 720. The controller 770 may direct the second power plant 750 to direct a third portion of its power output to the first load 710 and a fourth portion of its power output to the second load 720. The controller 770 may direct the virtual power plant 745 to direct its power output to the third load.

The controller 770 may direct the first power plant 740 and the second power plant 750 to direct power to the first load 710 and the second load 720 to satisfy the first power delivery profile and the second power delivery profile. If the power output of the first power plant 740 is sufficient to satisfy the first power delivery profile of the first load 710 and the power output of the second power plant 750 is sufficient to satisfy the second power delivery profile of the second load 720, the controller 770 may direct the first power plant 740 to direct sufficient power to the first load 710 to satisfy the first power delivery profile and direct the second power plant 750 to direct sufficient power to the second load 720 to satisfy the second power delivery profile. If the power output of the first power plant 740 is insufficient to satisfy the first power delivery profile of the first load 710 and the power output of the second power plant 750 is sufficient to satisfy the second power delivery profile of the second load 720, the controller 770 may direct the first power plant 740 to direct its power output to the first load 710 and direct the second power plant 750 to direct sufficient power to the second load 720 to satisfy the second power delivery profile and an amount of power to the first load 710 sufficient, when combined with the power output of the first power plant 740, to satisfy the first power delivery profile of the first load 710. Since the power outputs of the first power plant 740 and the second power plant 750 are not tightly correlated, it is likely that if the power output of the first power plant 740 is insufficient to satisfy the first power delivery profile, the second power plant 750 has sufficient power output in excess of what is require by the second power delivery profile to supplement the power output of the first power plant 740 to satisfy the first power delivery profile.

The combined power output of the first power plant 740 and the second power plant 750 which exceeds the first power delivery profile and the second power delivery profile may be directed by the controller 770 from the virtual power plant 745 to satisfy the third power delivery profile of the third load 715. If the combined power output of the first power plant 740 and the second power plant 750 does not exceed the combination of the first power delivery profile and the second power delivery profile, no power may be directed to satisfy the third power delivery profile.

In some embodiments, the first power plant 740 and the second power plant 750 may be selected to be networked. The first power plant 740 and the second power plant 750 may be selected for networking based on a level of correlation between the first power output and the second power output. The first power plant 740 and the second power plant 750 may be selected for networking based on a determination that the first power output and the second power output are the least correlated of a plurality of power outputs of a plurality of power plants. In some embodiments, the first power output is compared to a plurality of power outputs to select the second power output which is the least correlated with the first power output of the plurality of power outputs. In other embodiments, the first power plant 740 and the second power plant 750 may be selected by optimizing for minimized correlation from a plurality of power plants. The controller 770 may select the first power plant 740 and the second power plant 750.

Figure 12:
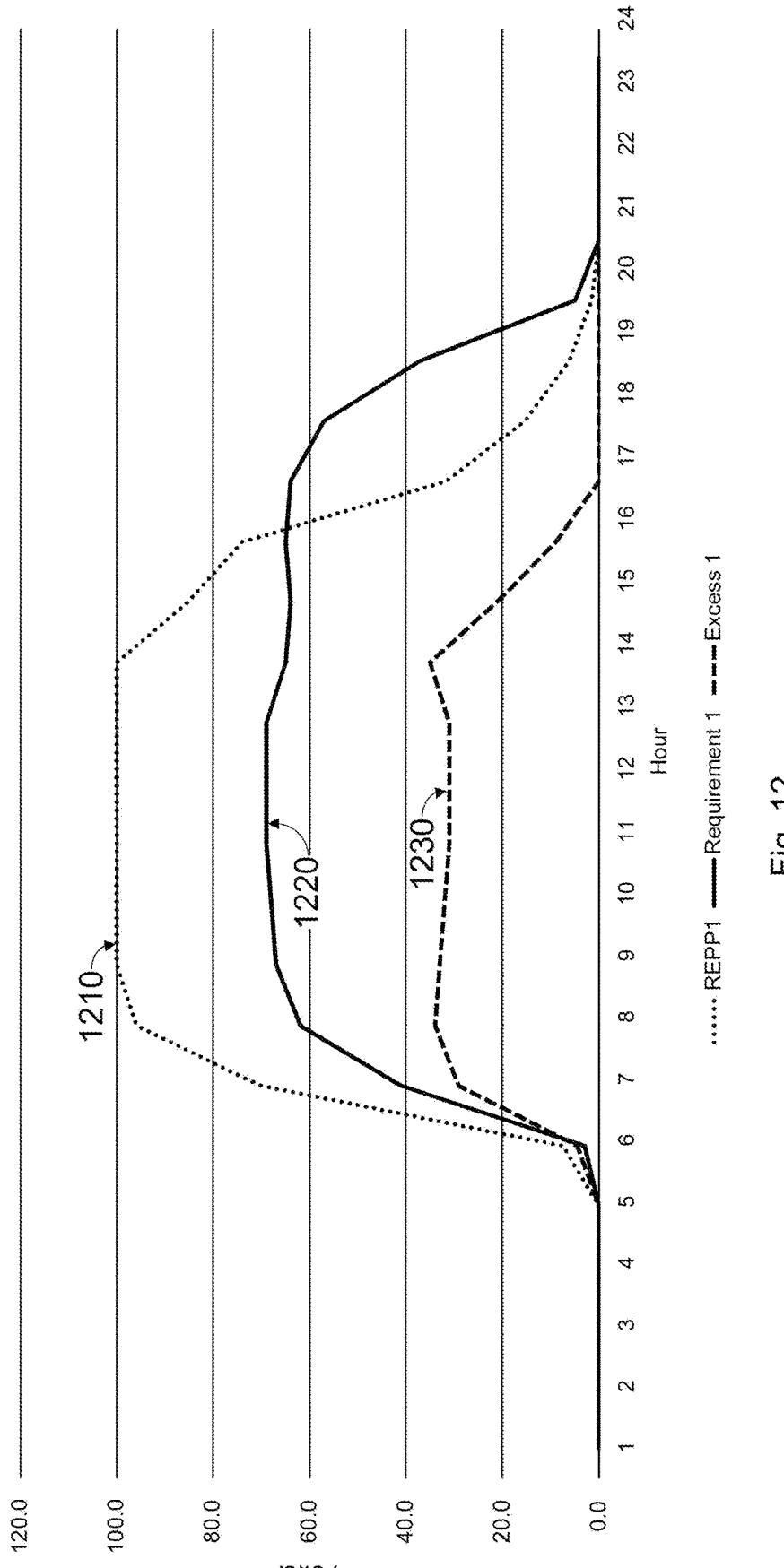
FIG. 12 illustrates a first REPP output, a first power delivery profile, and a first excess output.

FIG. 12 illustrates a first REPP output 1210, a first power delivery profile 1220, and a first excess output 1230. The first REPP output 1210 may be the first REPP output of the first power plant 740 of FIG. 11. The first delivery profile 1220 may be the first power delivery profile of the first load 710 of FIG. 11. The first excess output 1230 may be the excess of the first REPP output 1210 over the first power delivery profile 1220. The first REPP output 1210 is shown by the dotted line, the first power delivery profile 1220 is shown by the solid line, and the first excess output 1230 is shown by the dashed line.

Figure 13:
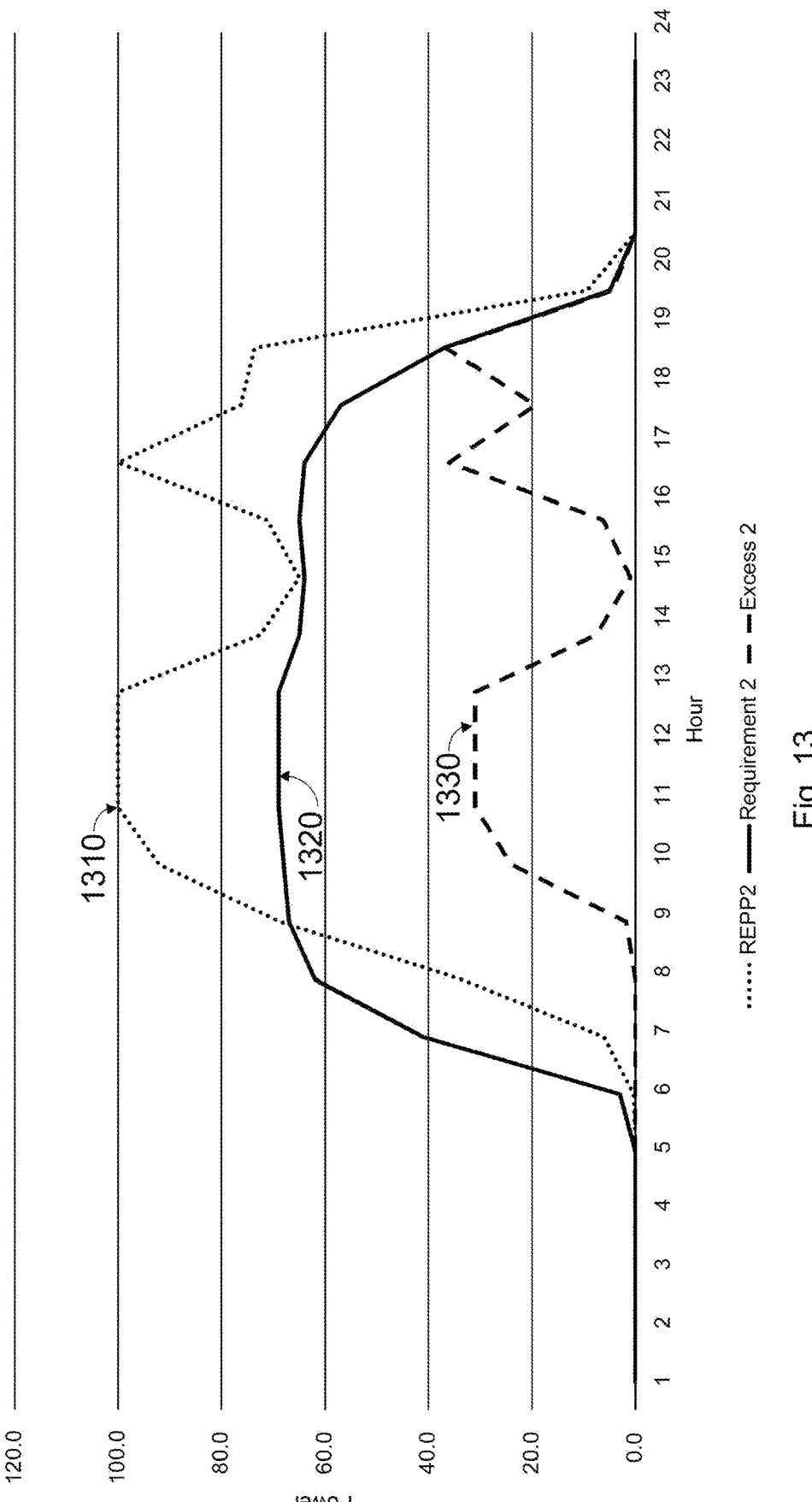
FIG. 13 illustrates a second REPP output, a second power delivery profile, and a second excess output.

FIG. 13 illustrates a second REPP output 1310, a second power delivery profile 1320, and a second excess output 1330. The second REPP output 1310 may be the second REPP output of the second power plant 750 of FIG. 11. The second delivery profile 1320 may be the second power delivery profile of the second load 720 of FIG. 11. The second excess output 1330 may be the excess of the second REPP output 1310 over the second power delivery profile 1320. The second REPP output 1310 is shown by the dotted line, the second power delivery profile 1320 is shown by the solid line, and the second excess output 1330 is shown by the dashed line. The second delivery profile 1320 is shown as being the same as the first delivery profile 1220 of FIG. 12, but the first delivery profile 1220 and the second delivery profile 1320 may be different.

Figure 14:
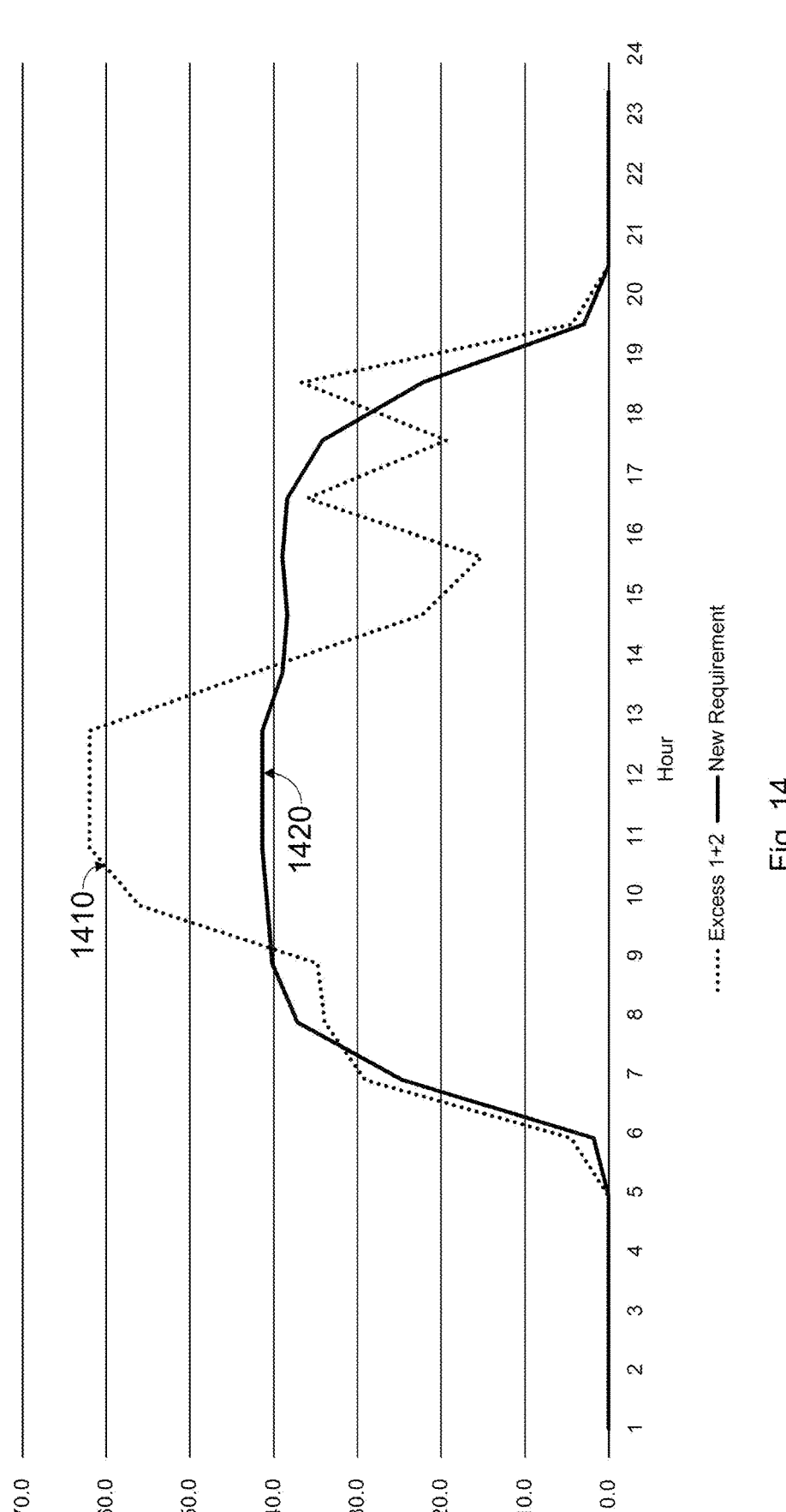
FIG. 14 illustrates a combined excess output and a third delivery profile.

FIG. 14 illustrates a combined excess output 1410 and a third power delivery profile 1420. The combined excess output 1410 may be a combination of the first excess output 1230 of FIG. 12 and the second excess output 1330 of FIG. 13. The combined excess output 1410 may be the output of the virtual power plant 745 of FIG. 11. The third power delivery profile 1420 may be the third power delivery profile of the third load 715 of FIG. 11. In some embodiments, the third power delivery profile 1420 represents the power requirements of the third load 715. In other embodiments, the third power delivery profile 1420 represents renewable power requested by the third load 715. The third power delivery profile 1420 may be smaller than the first power delivery profile 1220 and the second power delivery profile 1320. The third power delivery profile 1420 may be based on an expected combined excess output 1410. The combined excess output 1410 may be less reliable than the first REPP output 1210 and the second REPP output 1310. In some embodiments, the combined excess output 1410 may be directed to more than one load and the third power delivery profile 1420 may represent a combination of power delivery profiles of various loads.

In some embodiments, the combined excess output 1410 is a combination of excess outputs of a plurality of REPPs. The plurality of REPPs may include any number of REPPs. The greater the number of the plurality of REPPs and the less correlated the outputs of the REPPs are, the greater the output and the greater the reliability of the combined excess output 1410. Additionally and/or alternatively, the greater the number of the plurality of REPPs and the less correlated the outputs of the REPPs are, the less excess capacity each REPP requires for the combined excess output 1410 to be reliable.

Figure 15:
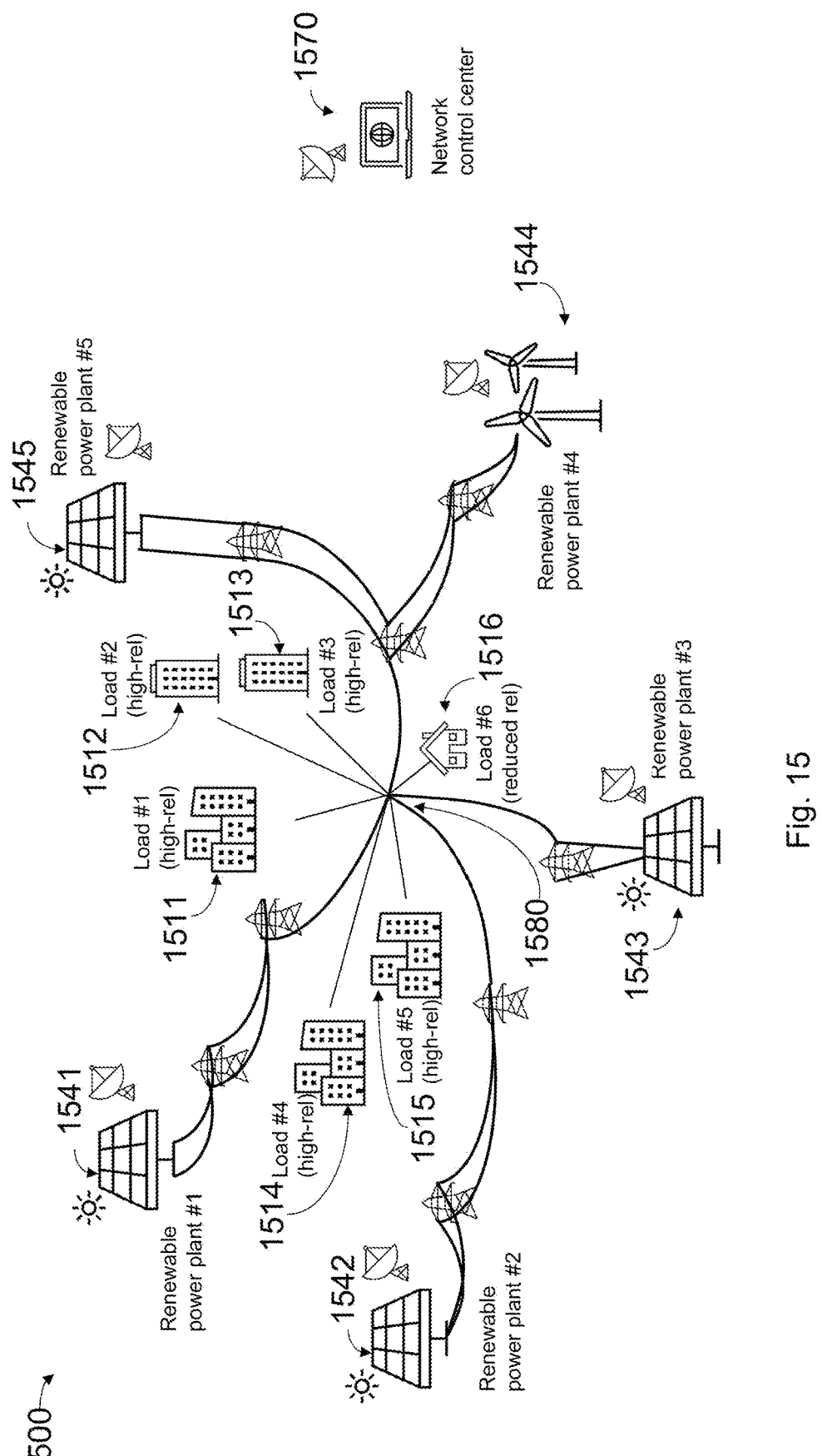
FIG. 15 illustrates another example environment in accordance with one or more embodiments.

FIG. 15 illustrates another example environment 1500 in accordance with one or more embodiments. The environment 1500 may include a first REPP 1541, a second REPP 1542, a third REPP 1543, a fourth REPP 1544, and a fifth REPP 1545. The first REPP 1541, the second REPP 1542, the third REPP 1543, and the fifth REPP 1545 may be solar power plants and the fourth REPP 1544 may be a wind power plant. The REPPs may be in distinct geographical locations and be remote from each other. The outputs of the REPPs may not be tightly correlated. The REPPs may communicate with a controller 1570 via a network. The controller 1570 may be the controller 770 or play a similar role as the controller 770 of FIG. 11.

The environment 1500 may include a first load 1511, a second load 1512, a third load 1513, a fourth load 1514, a fifth load 1515, and a sixth load 1516. The first load 1511, the second load 1512, the third load 1513, the fourth load 1514, and the fifth load 1515 may be high-reliability loads, such that they require reliable delivery of renewable power. The high-reliability loads may require renewable energy equal to their power requirements or equal to a portion of their power requirements with a reliability above a threshold reliability. The environment 1500 may include a sixth load 1516. The sixth load 1516 may be a low-reliability load, such that it does not require reliable delivery of renewable power. Low-reliability loads may utilize renewable power when it is available and power from other sources when renewable power is not available. The first load 1511, the second load 1512, the third load 1513, the fourth load 1514, the fifth load 1515, and the sixth load 1516 may be electrically coupled to the first REPP 1541, the second REPP 1542, the third REPP 1543, the fourth REPP 1544, and the fifth REPP 1545 via a grid 1580. The grid 1580 may be electrically coupled to additional power sources and loads.

In some embodiments, the controller 1570 may determine power output setpoints for the REPPs 1541-1545. Setting the power outputs for the REPPs 1541-1545 may include receiving a first signal indicating the power delivery profile for the first load 1511 and determining setpoints for the REPPs 1541-1545 such that the combined power output of the REPPs 1541-1545 is sufficient to satisfy the power delivery profile of the first load 1511. The controller 1570 may receive a second signal indicating the power delivery profile for the second load 1512 and determine setpoints for the REPPs 1541-1545 such that the combined power output of the REPPs 1541-1545 is sufficient to satisfy the power delivery profiles of the first load 1511 and the second load 1512. The controller 1570 may receive a signal from each of the loads 1511-1516 and determine setpoints for the REPPs 1541-1545 such that the combined power output of the REPPs 1541-1545 is sufficient to satisfy the power delivery profiles of the loads 1511-1516.

The REPPs may be networked as discussed herein such that a combined excess output of the REPPs in excess of the requirements of the high-reliability loads functions as a virtual power plant. The virtual power plant may direct power to the sixth load 1516.

In an example, if the combined output of the REPPs 1541-1545 is more than the sum of power delivery profiles of loads 1511-1516, the controller 1570 may set power outputs for the REPPs 1541-1545 equal to a combined power delivery profile of the loads 1511-1516. The controller 1570 may notify the loads 1511-1516 that the power delivered to the loads 1511-1516 from the REPPs 1541-1545 via the grid was sufficient to satisfy their power delivery profiles.

In another example, if the combined output of the REPPs 1541-1545 is more than the sum of the power delivery profiles of the loads 1511-1515, but not more than the sum of the power delivery profiles of the loads 1511-1516, the controller 1570 may set power outputs for the REPPs 1541-1545 equal to maximum current power outputs for the REPPs 1541-1545. The controller 1570 may allocate power to the loads 1511-1515 sufficient to satisfy their power delivery profiles and notifies the loads 1511-1515 that the power delivered to the loads 1511-1515 was sufficient to satisfy their power delivery profiles. The controller 1570 may allocate a remainder of the combined output of the REPPs 1541-1545 to the sixth load 1516 and notifies the sixth load 1516 of an amount of the remainder of the combined output of the REPPs 1541-1545 which was delivered to the sixth load 1516.

In yet another example, if the combined output of the REPPs 1541-1545 is less than the sum of the power delivery profiles of loads 1511-1515, the controller 1570 may set power outputs for the REPPs 1541-1545 equal to maximum current power outputs for the REPPs 1541-1545. The controller 1570 may allocate power to the loads 1511-1515 and notify the loads 1511-1515 of amounts of power delivered to the loads 1511-1515 and whether the amounts of power delivered to the loads 1511-1515 were sufficient to satisfy their power delivery profiles. The controller 1570 may notify the sixth load 1516 that no power was delivered to the sixth load 1516 from the REPPs 1541-1545.

FIG. 16 is a flowchart of an example method 1600 for allocating power from networked power plants in accordance with one or more embodiments. Additional, fewer, or different operations may be performed in the method, depending on the embodiment. Further, the operations may be performed in the order shown, concurrently, or in a different order.

At 1610, a controller receives a first power delivery profile for a first load. The controller may store the first power delivery profile in a memory of the controller. The power delivery profile may represent a request for amounts of power at different times. For example, a load desiring to use only renewable energy may have a power delivery profile equal to its power requirements. At 1620, the controller receives a second power delivery profile for a second load. The controller may store the second power delivery profile in the memory. The second power delivery profile may be the same or different from the first power delivery profile. At 1630, the controller may determine a power output capability of a first power plant and a power output capability of a second power plant. The first power plant and the second power plant may be renewable energy power plants (REPPs). The controller may store the power output capabilities of the first and second power plants in the memory. Determining the power output capabilities of the first and second power plants may include receiving an indication of the power output capabilities of the first and second power plants via a network. In some embodiments, the power output capabilities of the first and second power plants may be predictions of power outputs of the first and second power plants. In other embodiments, the power output capabilities of the first and second power plants may be current maximum output capabilities of the first and second power plants.

At 1640, the controller sets a first power output for the first power plant and a second power output for the second power plant based on the power delivery profiles of the first and second loads and the power output capabilities of the first and second power plants. Setting the first and second power outputs may include determining a combined power output capability of the first and second power plants and a combined power delivery profile of the first and second loads. The controller may determine whether the combined power output capability is sufficient to satisfy the combined power delivery profile. The controller may compare the combined power output capability to the combined power delivery profile and determine points where the combined power output capability exceeds the combined power delivery profile. The controller may set the first power output and the second power output such that the combined power output satisfies the combined power delivery profile. Setting the first power output and the second power output may include sending an indication to the first and second power plants of power output levels at different times. For example, if the power output capability of the first power plant exceeds the first power delivery profile by an amount sufficient to compensate for a deficiency in the power output capability of the second power plant, the controller will set the second power output to a maximum possible amount and the first power output to an amount sufficient to satisfy the first power delivery profile and the second power delivery profile when combined with the second power output. In some embodiments, the controller may set the power outputs of the first and second power plants in real time. In other embodiments, the controller may set the power outputs of the first and second power plants for a time period.

At 1650, the controller allocates the power outputs of the first and second power plants to the first and second loads. In some embodiments, allocating the power outputs of the first and second power plants to the first and second loads includes notifying the first load of a first amount of power allocated to the first load and whether the first amount of power is sufficient to satisfy the first power delivery profile and notifying the second load of a second amount of power allocated to the second load and whether the second amount of power is sufficient to satisfy the second power delivery profile.

At 1660, power is delivered to the first load and the second load. The controller may direct the first power plant and the second power plant to deliver the allocated power outputs to the first and second loads. The first and second power plants may deliver the allocated power outputs to the first and second loads via a grid. In some embodiments, delivering the power outputs of the first and second power plants to the first and second loads includes notifying the first load of a first amount of power delivered to the first load and whether the first amount of power is sufficient to satisfy the first power delivery profile and notifying the second load of a second amount of power delivered to the second load and whether the second amount of power is sufficient to satisfy the second power delivery profile.

FIG. 17 is a flowchart of an example method 1700 for delivering power using a virtual power plant in accordance with one or more embodiments. Additional, fewer, or different operations may be performed in the method, depending on the embodiment. Further, the operations may be performed in the order shown, concurrently, or in a different order.

At 1710, a controller receives a power delivery profile for each of a first load and a second load. The power delivery profile for each load may represent a request for amounts of power at different times. For example, a load desiring to use only renewable energy may have a power delivery profile equal to its power requirements. The controller may store the power delivery profile of the first and second load in a memory of the controller. At 1720, the controller determines a power output capability of a first power plant and a power output capability of a second power plant. The first power plant and the second power plant may be renewable energy power plants (REPPs). Determining the power output capabilities of the first and second power plants may include receiving an indication of the power output capabilities of the first and second power plants via a network. In some embodiments, the power output capabilities of the first and second power plants may be predictions of power outputs of the first and second power plants. In other embodiments, the power output capabilities may of the first and second power plants may be current maximum output capabilities of the first and second power plants. The controller may store the power output capabilities of the first and second power plants in the memory.

At 1730, the controller determines a first amount of a combined power output capability of the first and second power plants in excess of the power delivery profile of the first load. Determining the first amount of the combined power output capability may include combining the power output capabilities of the first and second power plants to obtain the combined power output capability and comparing, using a processor of the controller, the combined power output capability to the power delivery profile of the first load. Power that is not needed to satisfy the power delivery profile of the first load is power produced in excess of the power delivery profile of the first load. The excess power output may be treated as a virtual power plant which may direct power to loads. The controller may store an indication of the excess power output in the memory. At 1740, the controller allocates a second amount of the combined output capability equal to the power delivery profile of the first load to the first load. In some embodiments, allocating the second amount of power to the first load includes notifying, by the controller, the first load of the amount of power allocated to the first load. The controller allocates sufficient power to the first load to satisfy the power delivery profile of the first load. At 1750, the controller allocates the first amount of power to the second load. In some embodiments, allocating the first amount of power to the second load includes notifying, by the controller, the second load of the amount of power allocated to the second load.

At 1760, the controller directs the first and second power plants to deliver the second amount of power to the first load and the first amount of power to the second load. In some embodiments, the controller directs the virtual power plant representing the excess power of the combined output capability to direct the first amount of power to the second load. The controller may direct the first, second, and virtual power plants via a network. The first, second, and virtual power plants may deliver power via a grid. In some embodiments, delivering the first amount of power to the second load includes notifying, by the controller, the second load of the amount of power allocated to the second load. In some embodiments, delivering the second amount of power to the first load includes notifying, by the controller, the first load of the amount of power allocated to the first load.

The embodiments disclosed herein represent various technical improvements. The specific implementation of setting power outputs of REPPs based on power delivery profiles and allocating power outputs to different loads is a solution to problems in delivering renewable energy over a grid. Previous methods for delivering renewable energy required local power generation and direct transmission of power from the REPP to the load. Connecting a load to a grid did not allow for the use of purely renewable energy because renewable power and non-renewable power are commingled on the grid. To deliver renewable power over a grid required an REPP to deliver an amount of power to the grid and allocate its output to a load, which would draw power from the grid equal to the amount of power delivered to the grid by the REPP. The REPP, due to fluctuations in power generation, would have to be oversized relative to power requirements of the load in order to reliably satisfy the power requirements. In contrast, the embodiments discussed herein offer the technical improvement of more efficiently allocating specific power outputs of networked REPPs to specific loads in order to more reliably and more efficiently satisfy the power requirements of the specific loads. More efficiently allocating the specific power outputs of networked REPPs to specific loads in order to satisfy the power requirements of the specific loads is a practical application that lowers construction and maintenance costs of the networked power plants. The embodiments discussed herein offer the technical improvement of allocating a combined power output of REPPs to specific loads to more reliably and efficiently satisfy the power requirements of the specific loads. Allocations of specific power outputs to specific loads may be stored in the memory of the controller. The controller may communicate the allocations to the loads over the network. The embodiments herein also provide for the practical application of providing energy products such as energy storage and power capacity associated with particular loads, power sources, and attributes. For example, the technical improvement of allocating specific power output of a specific REPP to a specific load allows that specific power output to be tracked and delivered to the specific load.

The technical improvement of more efficiently allocating outputs of REPPs to loads provides for the practical application of an operator of multiple REPPs contracting with loads for the delivery of power. Instead of each operator of individual REPPs contracting to sell an amount of power allocated to a load, the operator of multiple REPPs can contract to sell a combined output of the multiple REPPs allocated to multiple loads. This results in more reliable delivery of renewable power as the combined output has less variability than outputs of individual REPPs. These technical improvements allow for greater flexibility and user customization in contracting for power than previous systems and methods.

Networking power plants to combine their outputs bears significant advantages over conventional systems. Networking power plants to combine their outputs provides the technical improvement of greater reliability of power output. Networking power plants improves the functioning of power plants by reducing the strain of power output fluctuations on individual plants. Networking power plants provides the technical improvement of allowing individual power plants to be built with less excess power output capacity. The practical application of this technical improvement is in reducing the cost of renewable power by building smaller REPPs with less excess power output capacity over power requirements. Networking power plants provides the technical improvement of utilizing excess combined power output as a virtual power plant. This has the practical application of providing renewable power to additional loads using excess power output that would not otherwise be delivered to a load.

Networked power plants may take advantage of solar forecasting to coordinate their outputs. Incorporating solar forecasting into the coordination of networked power plants has the technical advantage of providing more accurate predictions of power outputs of networked power plants. Utilizing more accurate predictions of power outputs of networked power plants allows for the combined output of networked power plants to be lower than it would be with less accurate predictions of power outputs the networked power plants. Outputs of each power plant of the networked power plants may be adjusted based on solar forecasts such that variability in the outputs of each power plant of the networked power plants caused by shadows or shade do not affect a variability of the combined output of the networked power plants. In addition, utilizing solar forecasting to coordinate the outputs of networked power plants solves the technical problem of ramping up or down power outputs of individual power plants of the networked power plants at rates sufficient to satisfy load power requirements. Without utilizing solar forecasting, sudden output decreases at first power plants due to shadow or shade may not be able to be compensated for with complementary output increases at second power plants due to limitations of maximum ramp-up rates of the second power plants. Utilizing solar forecasting allows the second power plants to ramp up their outputs in anticipation of output decreases at the first power plants due to shadow or shade. Utilizing solar forecasting allows networked power plants to ramp up and down their output at rates that increase the useful lifespan of RESs and ESSs of the networked power plants.

FIG. 18 is a flowchart of an example method 1800 for delivering power from networked power plants using solar forecasting. Additional, fewer, or different operations may be performed in the method, depending on the embodiment. Further, the operations may be performed in the order shown, concurrently, or in a different order.

At 1810, a controller of a plurality of networked power plants as described herein obtains irradiance data at a first time and a second time from a plurality of sensors. In some embodiments, the sensors may be disposed among or adjacent the networked power plants. For example, the sensors may be disposed between solar modules of the networked power plants and along or adjacent to the perimeter of grids of solar modules of the networked power plants. There may be at least about 1 solar module per sensor, 2 solar modules per sensor, 3 solar modules per sensor, 4 solar modules per sensor, 5 solar modules per sensor, 10 solar modules per sensor, 20 solar modules per sensor, or more. The sensors may be irradiance meters. In other embodiments, the sensors may be disposed over a geographic area. For example, the sensors may be disposed in a grid over a geographic area. In another example, the sensors may be part of rooftop solar units distributed throughout a city.

In some embodiments, inverters that are used to convert DC power generated by solar modules to AC power may be used as sensors. The inverters may be disposed among arrays of solar modules of the networked power plants, and a particular inverter may be connected to a subset of adjacent solar modules. The inverters may have built-in sensors that are configured to measure electric power. For example, the sensors may be components of a supervisory control and data acquisition (SCADA) system of the inverters. The irradiance of the solar modules that are connected to a particular inverter can be inferred from the power output of that inverter. The use of inverters as sensors may be advantageous because it may allow the implementation of the forecasting system described herein without specialized or dedicated hardware.

The first time may be before the second time. The first time and the second time may be separated by any unit of time. For example, the first time and the second time may be separated by one second to measure the velocity of a shadow cast by a cloud. In another example, the first time and the second time may be separated by one year to measure shade cast by stationary objects such as buildings at a particular time of year.

At 1820, the controller determines whether one or more solar modules of a plurality of networked power plants will be covered by a shadow or shade at a third time based on the irradiance data. The third time may be after the second time. The first time and the second time may be separated by any unit of time. For example, the second time and the third time may be separated by 1 second to predict whether adjacent solar modules will be shaded by a passing cloud. In another example, the second time and the third time may be separated by one year to predict how solar modules of the plurality of networked power plants will be shaded by stationary objects such as buildings at a particular time of year.

The controller may be configured to determine whether the one or more solar modules of the plurality of networked power plants will be covered by a shadow or shade at the third time by determining a position and a shape of the shadow or shade at the first or second time. The controller may be configured to determine whether the one or more solar modules of the plurality of networked power plants will be covered by a shadow or shade at the third time by determining a velocity of the shadow or shade. For example, the controller may determine that a circular shadow cast by a cloud is above a first subset of solar modules of a first power plant of the plurality of networked power plants and, based on a velocity of the shadow, the shadow will be above a second subset of solar modules of the first power plant at the third time. In another example, the controller may determine that a circular shadow cast by a cloud is above a first subset of solar modules of a first power plant of the plurality of networked power plants and, based on a velocity of the shadow, the shadow will be above a second subset of solar modules of a second power plant of the plurality of networked power plants at the third time. In yet another example, the controller may determine that a shadow cast by a mountain shades a first subset of solar modules of a first power plant of the plurality of networked power plants and, based on a velocity of the shadow, the shadow will be above a second subset of solar modules of a second power plant of the plurality of networked power plants at the third time.

At 1830, the controller may generate, based at least in part on the determination, a power output prediction for each power plant of the plurality of networked power plants at the third time. In some embodiments, the controller may calculate an output for each power plant of the plurality of networked power plants by determining a predicted irradiance for each solar module of each power plant and multiplying the predicted irradiance by a conversion factor for each solar module of each power plant. In other embodiments, the controller may calculate an output for each power plant of the plurality of networked power plants by determining a predicted irradiance for each solar array of each power plant and multiplying the predicted irradiance by a conversion factor for each solar array of each power plant. In yet other embodiments, the controller may calculate an output for each power plant of the plurality of networked power plants by determining a predicted irradiance for each power plant and multiplying the predicted irradiance by a conversion factor for each power plant.

At 1840, the controller may receive a first power delivery profile for a first load and a second power delivery profile for a second load. The first load may have a first power delivery profile which details power requirements for the first load at different times. The second load may have a second power delivery profile which details power requirements for the second load at different times. For example, the first power delivery profile may detail that the first load requires 50 MW from 9 A.M. to 5 P.M. and the second load requires 10 MW from 9 A.M. to 5 P.M. and 70 MW from 5 P.M. to 8 P.M. In another example, the first power delivery profile may be similar to the first power delivery profile 820 of FIG. 8 and the second power delivery profile may be similar to the second power delivery profile 920 of FIG. 9.

At 1850, the controller may adjust a power output of one or more power plants of the plurality of networked power plants based at least in part on the power output prediction, the power delivery profile for the first load, and the power delivery profile for the second load. The controller may adjust a power output of a first plant upward based on the power output prediction of a second plant being lowered due to shadow and shade. The controller may adjust the power output of the first plant upward to compensate for the lowered predicted output of the second plant. The controller may be configured to adjust the power output of the one or more of the plurality of networked power plants such that the combined power output of the plurality of networked power plants satisfies the power delivery profile for the first load and the power delivery profile for the second load. The controller may balance contributions from the plurality of networked power plants to the combined output to maintain the combined output despite fluctuations in output of individual power plants due to shade or shadow.

In some embodiments, the controller is configured to adjust the power output of the one or more of the plurality of networked power plants such that a variability of the combined output of the plurality of networked power plants is less than a variability of an output of each power plant of the plurality of networked power plants. Variability may be introduced into the output of a power plant by shade or shadow, but the controller may balance contributions from the plurality of networked power plants to the combined output such that the increased variability due to shade or shadow is not reflected in the combined output. The combined output may be kept steady throughout fluctuations in outputs of individual plants due to shade or shadow.

In some embodiments, the controller is configured to adjust the power output of the one or more power plants of the plurality of networked power plants by adjusting a charge/discharge of an energy storage system (ESS) of the one or more power plants of the plurality of networked power plants. For example, a first power plant may increase its output to compensate for a lowered predicted output of a second power plant due to shade or shadow. The first power plant may increase its output by drawing power from an ESS of the first power plant. The ESS discharge may be equal to an amount of lowered output from the second power plant. In another example, a first power plant may have a lowered predicted output due to shade or shadow. The first power plant may compensate for a portion of its lowered predicted output by discharging a first ESS associated with the first power plant. A second power plant may compensate for the remainder of the lowered predicted output of the first power plant by reducing a rate of charge of a second ESS associated with the second power plant such that an output of the second power plant increases to compensate for the remainder of the lowered predicted output of the first power plant. The controller may send signals to the plurality of networked power plants to adjust a charge/discharge of each ESS associated with the networked power plants. To increase output, an ESS charge may be decreased or an ESS discharge increased. A variety of combinations of ESS charge decreases and ESS discharge increases may be utilized to increase output to compensate for fluctuations in output of networked power plants due to shade or shadow.

In some embodiments, the controller is configured to adjust the power output of the one or more power plants of the plurality of networked power plants such that ramp-up rates and ramp-down rates of the plurality of networked power plants are within a predefined range. In other embodiments, the controller is configured to adjust the power output of the one or more power plants of the plurality of networked power plants to optimize ramp-up rates and ramp-down rates according to an effect of the ramp-up rates and the ramp-down rates on a longevity of components of the plurality of networked power plants. For example, the controller may adjust the power output of the one or more power plants of the plurality of networked power plants such that the ramp-up rates and ramp-down rates are as slow as possible.

At 1860, the controller allocates a combined power output of the plurality of networked power plants to the first and second loads. Allocating the combined power output may include matching power usage by the first and second loads to outputs of the plurality of networked power plants. Allocating the combined power output may include assigning the combined power output to the first and second loads.

In some embodiments, the controller is configured to deliver the allocated combined output to the first load and the second load via a grid. The controller may be configured to send signals to the plurality of networked power plants to deliver power over the grid. The controller may allocate the combined power output to the first and second loads by communicating to the first load a first amount of power delivered to the first load and communicating to the second load a second amount of power delivered to the second load. For example, the plurality of power plants may produce 80 MW of power delivered to a grid. A factory may use 70 MW of power from the grid and a home may use 20 MW of power from the grid. The controller may communicate to the factory that 70 MW of the 80 MW produced by the plurality of power plants was allocated to and delivered to the factory. The controller may communicate to the home that 10 MW of the 80 MW produced by the plurality of power plants was allocated to and delivered to the home.

The controller may allocate power to the first and second loads based on the power delivery profiles of the first and second loads. In some embodiments, the controller may adjust how much power is delivered to each load based on the power output prediction for each power plant. For example, the controller may allocate less power to each load if the combined power output is lowered due to shade or shadow. In another example, the controller may allocate less power to only certain loads if the combined power output is lowered due to shade or shadow. In yet another example, the controller may allocate reduced amounts of power to loads according to a ranking of the loads. The ranking of loads may be based on power purchase agreements between the plurality of power plants and the loads.

In an illustrative embodiment, any of the operations described herein can be implemented at least in part as computer-readable instructions stored on a computer-readable memory. Upon execution of the computer-readable instructions by a processor, the computer-readable instructions can cause a node, such as a computing node or a power plant node, to perform the operations.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "similar," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A non-transitory, processor-readable medium storing instructions that, when executed by a processor, cause the processor to:

set a power output for a first renewable energy power plant (REPP) and a power output for a second REPP based at least in part on a power delivery profile for a first load and a power delivery profile for a second load, the power output for the first REPP and the power output for the second REPP collectively defining a combined power output;

identify a first desired allocation of the combined power output for the first load and a second desired allocation of the combined power output for the second load;

at least one of:

cause transmission of a signal representing the first desired allocation to the first load, or cause transmission of a signal representing the second desired allocation to the second load; and cause delivery, during a time period, of the combined power output to a grid.

2. The non-transitory, processor-readable medium of claim 1, further storing instructions to cause the processor to record a difference between the first desired allocation and a total amount of power received at the first load from the grid during the time period.

3. The non-transitory, processor-readable medium of claim 1, further storing instructions to cause the processor to:

record a difference between the first desired allocation and a total amount of power received at the first load from the grid during the time period; and record a difference between the second desired allocation and a total amount of power received at the second load from the grid during the time period.

4. The non-transitory, processor-readable medium of claim 3, further storing instructions to cause the processor to calculate an energy request based on at least one of (1) the difference between the first desired allocation and the total amount of power received at the first load from the grid during the time period, or (2) the difference between the second desired allocation and the total amount of power received at the second load from the grid during the time period.

5. The non-transitory, processor-readable medium of claim 1, wherein the instructions to cause delivery of the combined power output to the grid include instructions to increase a discharge of an energy storage system (ESS) of at least one of the first REPP or the second REPP.

6. The non-transitory, processor-readable medium of claim 1, wherein the instructions to cause delivery of the combined power output to the grid include instructions to decrease a charge of an energy storage system (ESS) of at least one of the first REPP or the second REPP.

7. A non-transitory, processor-readable medium storing instructions that, when executed by a processor, cause the processor to:

set a power output for a first renewable energy power plant (REPP) and a power output for a second REPP based at least in part on a power delivery profile for a first load and a power delivery profile for a second load, the power output for the first REPP and the power output for the second REPP collectively defining a combined power output;

identify a first desired allocation of the combined power output for the first load and a second desired allocation of the combined power output for the second load;

cause transmission of at least one of: (1) a signal representing the first desired allocation to the first load, or (2) a signal representing the second desired allocation to the second load;

cause delivery, during a time period, of a first portion of the combined power output to a grid and not to the second load; and cause delivery, during the time period, of a second portion of the combined power output to the second load and not to the grid.

8. The non-transitory, processor-readable medium of claim 7, wherein the instructions to identify the first desired allocation of the combined power output for the first load and the second desired allocation of the combined power output for the second load include instructions to identify the first desired allocation and the second desired allocation based on a ranking of the first load and the second load.

9. The non-transitory, processor-readable medium of claim 7, wherein the instructions to identify the first desired allocation of the combined power output for the first load and the second desired allocation of the combined power output for the second load include instructions to identify the first desired allocation and the second desired allocation based on power usage predictions for the first load and the second load.

10. The non-transitory, processor-readable medium of claim 7, further storing instructions to cause the processor to record a difference between the first desired allocation and a total amount of power received at the first load from the grid during the time period.

11. The non-transitory, processor-readable medium of claim 7, further storing instructions to cause the processor to record a difference between the second desired allocation and a total amount of power received at the second load during the time period.

12. The non-transitory, processor-readable medium of claim 7, wherein the instructions to cause delivery of the first portion of the combined power output to the grid include instructions to increase a discharge of an energy storage system (ESS) of at least one of the first REPP or the second REPP.

13. The non-transitory, processor-readable medium of claim 7, wherein the instructions to cause delivery of the second portion of the combined power output to the second load include instructions to increase a discharge of an energy storage system (ESS) of at least one of the first REPP or the second REPP.

14. The non-transitory, processor-readable medium of claim 7, wherein the instructions to cause delivery of the first portion of the combined power output to the grid include instructions to decrease a charge of an energy storage system (ESS) of at least one of the first REPP or the second REPP.

15. A non-transitory, processor-readable medium storing instructions that, when executed by a processor, cause the processor to:

define a combined power output that is associated with (1) a first renewable energy power plant (REPP) and (2) a second REPP, based at least in part on a power delivery profile for a first load and a power delivery profile for a second load;

cause transmission of at least one of: (1) a signal representing a first desired allocation of the combined power output to the first load, or (2) a signal representing a second desired allocation of the combined power output to the second load;

cause delivery, during a time period, of a first portion of the combined power output to a grid; and cause delivery, during the time period, of a second portion of the combined power output to one of the first load or the second load.

16. The non-transitory, processor-readable medium of claim 15, further storing instructions to cause the processor to record a difference between the first desired allocation and a total amount of power received at the first load from the at least one of the first REPP or the second REPP during the time period.

17. The non-transitory, processor-readable medium of claim 15, further storing instructions to cause the processor to record a difference between the second desired allocation and a total amount of power received at the second load during the time period.

18. The non-transitory, processor-readable medium of claim 15, wherein the instructions to cause delivery of the first portion of the combined power output to the grid include instructions to increase a discharge of an energy storage system (ESS) of at least one of the first REPP or the second REPP.

19. The non-transitory, processor-readable medium of claim 15, wherein the instructions to cause delivery of the combined power output to the grid include instructions to decrease a charge of an energy storage system (ESS) of at least one of the first REPP or the second REPP.

20. The non-transitory, processor-readable medium of claim 15, wherein the instructions to cause delivery of the second portion of the combined power output to the one of the first load or the second load include instructions to increase a discharge of an energy storage system (ESS) of at least one of the first REPP or the second REPP.

* * * * *